(12) United States Patent
Tsutsui et al.

(10) Patent No.: US 6,246,647 B1
(45) Date of Patent: Jun. 12, 2001

(54) OPTICAL DISC APPARATUS, DRIVING CONTROL METHOD FOR OBJECTIVE LENS, CONTROL METHOD FOR OPTICAL HEAD AND RECORDING/REPRODUCING METHOD FOR OPTICAL HEAD

(75) Inventors: Keiichi Tsutsui; Yoshinori Matsumoto, both of Kanagawa; Hiroshi Saeki, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/173,745

(22) Filed: Oct. 16, 1998

(30) Foreign Application Priority Data

| Oct. 16, 1997 | (JP) | 9-283900 |
| Oct. 16, 1997 | (JP) | 9-284100 |
| Feb. 9, 1998 | (JP) | 10-027580 |

(51) Int. Cl.⁷ ...................................... G11B 7/09
(52) U.S. Cl. .................... 369/44.29; 369/44.28; 369/44.32
(58) Field of Search ............... 369/44.27, 44.28, 369/44.29, 44.32, 44.34, 44.35, 47, 54

(56) References Cited

U.S. PATENT DOCUMENTS

| 4,722,079 | * | 1/1988 | Matsumoto ........................ 369/44.32 |
| 5,286,965 | | 2/1994 | Okada . | |
| 5,825,729 | * | 10/1998 | Ogasawara et al. .......... 369/44.34 X |

FOREIGN PATENT DOCUMENTS

| 0 420 375 | 4/1991 | (EP) . |
| 60-147938 | 8/1985 | (JP) . |
| 63-046631 | 2/1988 | (JP) . |
| 01027033 | 1/1989 | (JP) . |
| 05144026 | 6/1993 | (JP) . |
| 05182206 | 7/1993 | (JP) . |
| 07311957 | 11/1995 | (JP) . |

* cited by examiner

*Primary Examiner*—Muhammad Edun
(74) *Attorney, Agent, or Firm*—Ronald P. Kananen; Rader, Fishman & Grauer

(57) ABSTRACT

A malfunction during focussing pull-in in an optical disc recording/reproducing apparatus is to be prevented. To this end, the optical disc recording/reproducing apparatus includes an optical pickup 7 having an objective lens 8 and a biaxial actuator, a photodetector for generating tracking error signals from the return light of the laser light illuminated on the optical disc and a position sensor for detecting the position of the objective lens relative to the optical disc. The optical disc recording/reproducing apparatus also includes an actuator driving circuit for controlling the servo operation of a biaxial actuator 9, based on the tracking error signals, so that the converging point of the light beam will be on the signal recording surface of the optical disc, and a pull-in range decision unit for outputting a permission signal according permission for the servo operation when the position of the objective lens 8 is within a preset range.

28 Claims, 15 Drawing Sheets

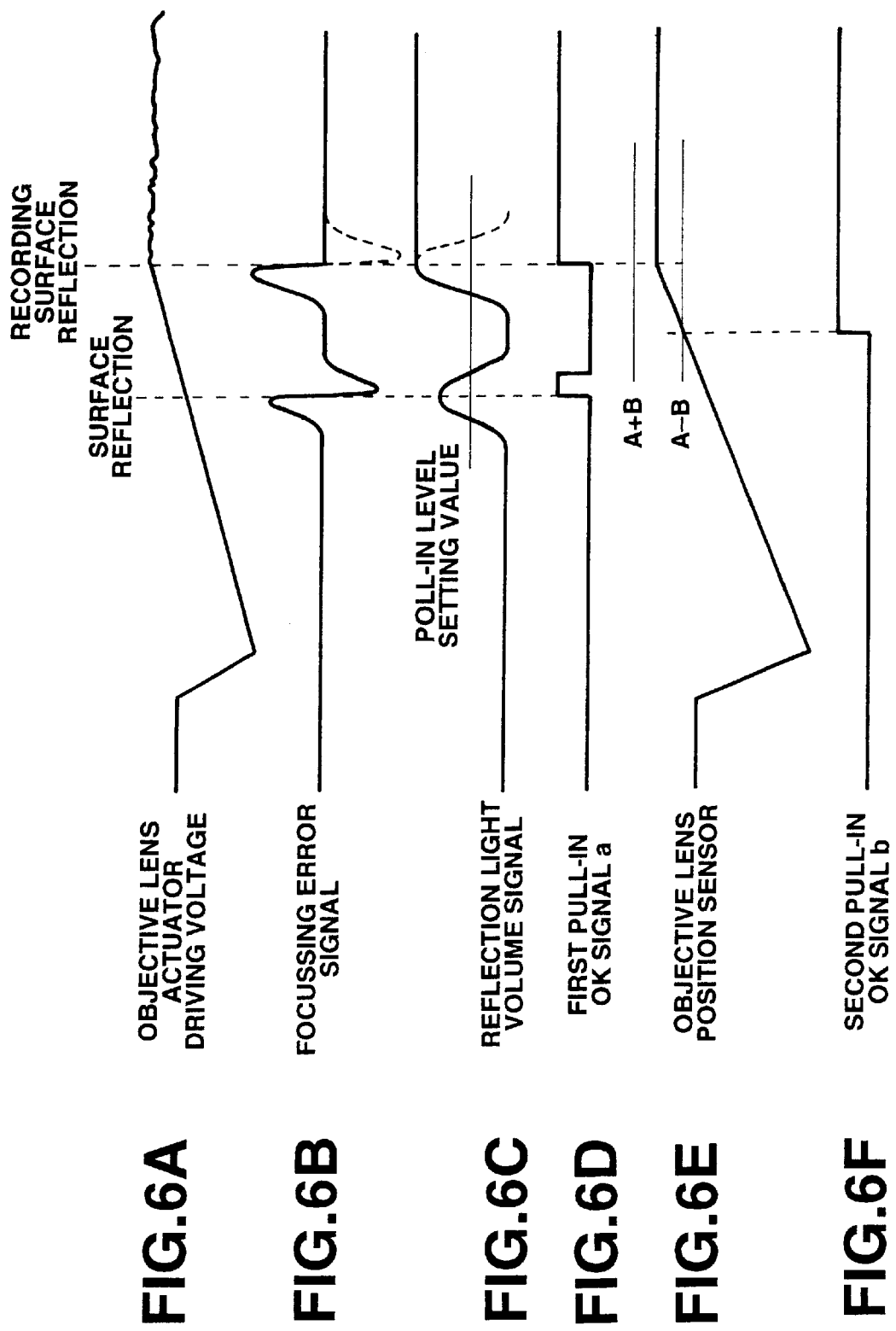

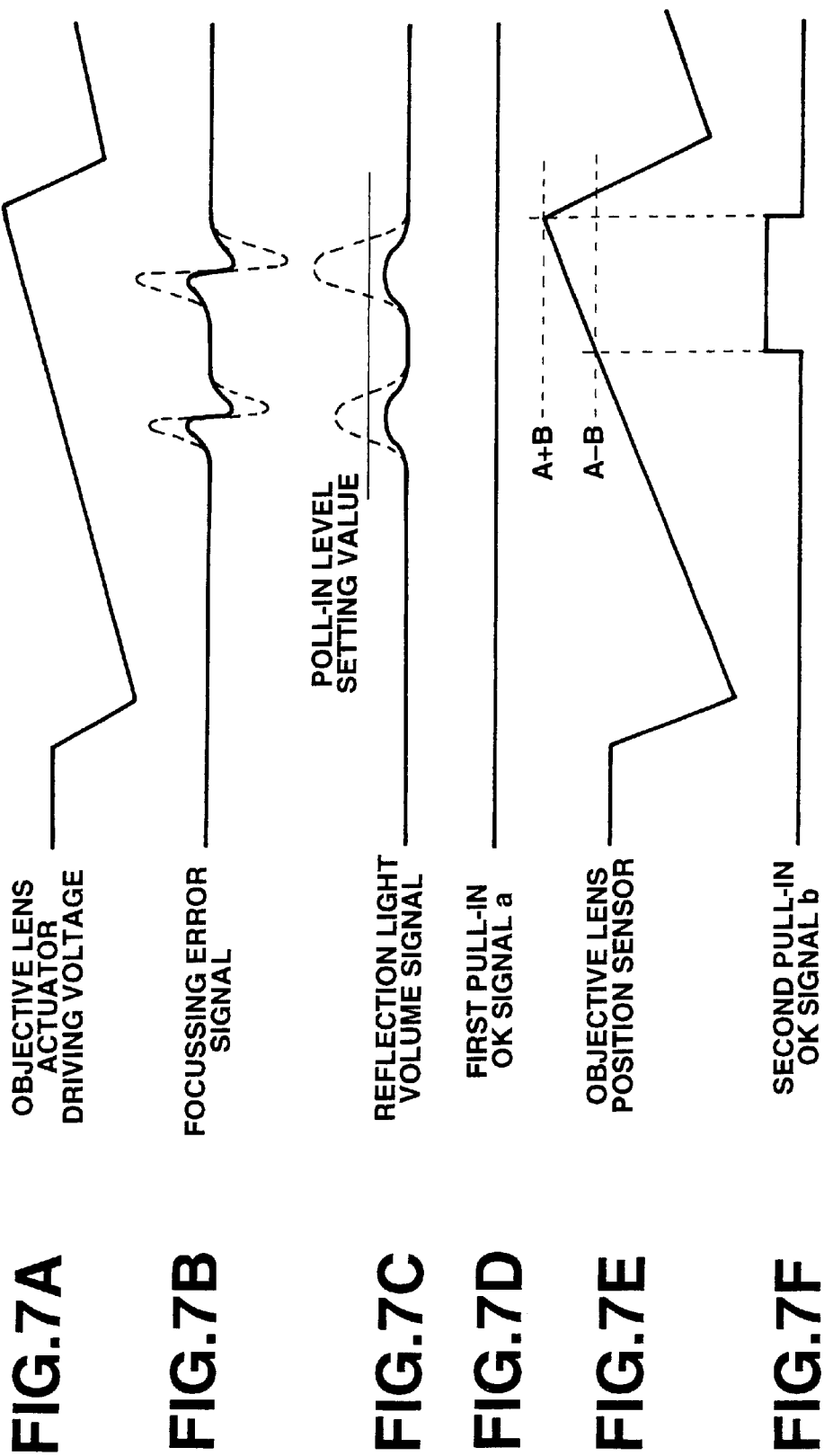

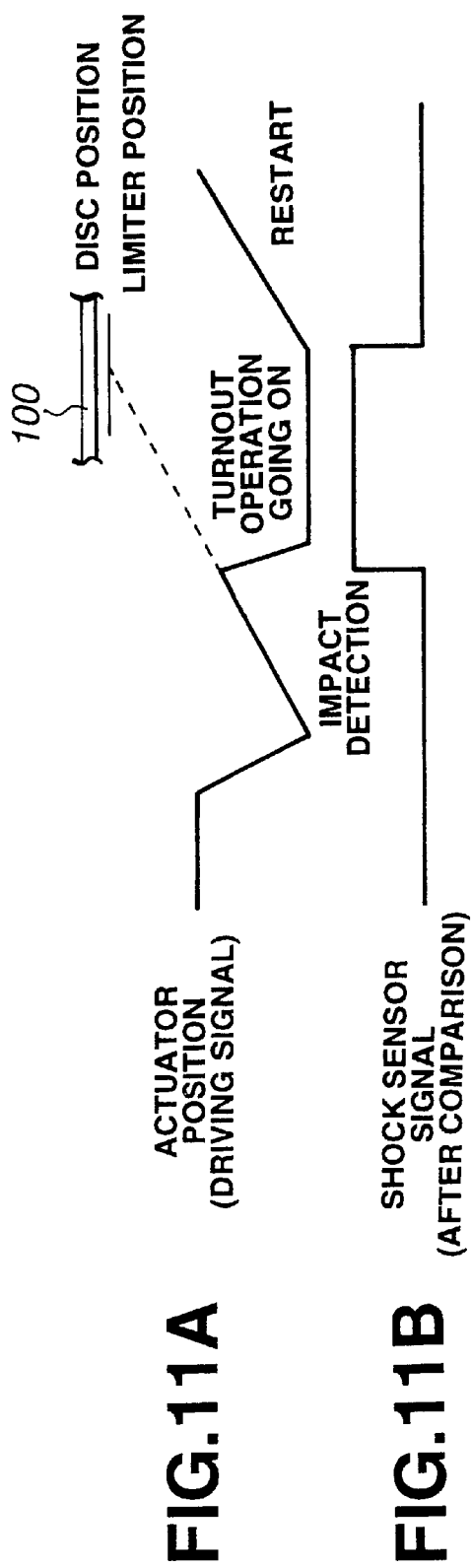

OPTICAL DISC APPARATUS, DRIVING CONTROL METHOD FOR OBJECTIVE LENS, CONTROL METHOD FOR OPTICAL HEAD AND RECORDING/REPRODUCING METHOD FOR OPTICAL HEAD

BACKGROUND OF THE INVENTION

1. Field of the Invention

This invention relates to a method and apparatus for recording information signal on an optical disc and/or reproducing information signals from an optical disc.

2. Description, of the Related Art

Recently, optical discs have been used for recording/reproducing not only the conventional music and text information but also high-definition still pictures, speech or moving pictures of higher quality for a prolonged time. Consequently there is an increasing demand for an optical disc of larger recording capacity or an optical disc device of a smaller size exploiting a recording/reproducing technique of high recording density.

For increasing the information volume per unit area in an optical disc, there is known a method for reducing the shortest mark length recorded on the optical disc or narrowing the track pitch. However, it is necessary in this case to reduce the diameter of a light spot used for recording/reproducing the reduced shortest mark length.

As a method to realize this, research into a high density optical disc system in which the light spot diameter is reduced by increasing the numerical aperture NA of the objective lens used for converging the light in the optical disc device is proceeding briskly.

In a known manner, the diameter of a light spot produced by a collimated light beam falling on a lens is represented by the following equation (1):

$$W_{em} = K_w (\lambda/NA) \qquad (1).$$

The equation (1) states that the light spot diameter $W_{em}$ is obtained by multiplying a quotient of the light wavelength $\lambda$ by the numerical aperture NA or $\lambda/NA$ with a constant $K_w$ determined over the shape of the lens aperture and the distribution of the intensity of the incident light beam.

Thus, the high recording density of the optical disc can be achieved by reducing the light spot diameter of the optical pickup by reducing the wavelength $\lambda$ of the laser light and increasing the numerical aperture NA.

If the numerical aperture of the optical pickup in the high recording density system is to be increased, and the diameter of the objective lens is the same as that of the conventional optical disc system, the working distance WD, which is the distance between the surface of the optical disc 100 and the objective lens 42, is shorter, as shown in FIG. 1.

That is, in FIG. 1A, a light beam 43 of the laser light having a diameter 2a is converged by an objective lens 42 spaced a working distance D from optical disc 100, so as to be illuminated through a medium of a refractive index n on a light converging point 41 on the optical disc 100 at a half angle θ of the maximum apex angle. The distance between the outer rim of the light beam 43 of the laser light on the objective lens 42 and the converging point 41 is R. The numerical aperture is given by the product of the refractive index n with the sine of the half angle θ of the maximum apex angle, or n·sinθ=n·a/R.

On the other hand, in FIG. 1B, a light beam 43 of the laser light having a diameter 2a is converged by the objective lens 42 spaced a working distance D' from the optical disc 100 so as to illuminated through a medium of a refractive index n on the light converging point 41 on the optical disc 100 at a half angle 6θ' of the maximum apex angle larger than the half angle θ of the above-mentioned maximum apex angle. The distance between the outer rim of the light beam 43 of the laser light on the objective lens 42 and the converging point 41 is R'. The numerical aperture is given by the product of the refractive index n with the sine of the half angle θ' of the maximum apex angle, or n·sinθ'=n·a/R'.

Comparison of FIGS. 1A and 1B indicates that, if the half angle θ of the maximum apex angle is increased to θ', the numerical aperture is increased from n·sinθ=n·a/R to n·sinθ'=n·a/R', however, the working distance is decreased from D to D'. Stated differently, the numerical aperture is increased, while the distance between the objective lens and the optical disc is decreased. Thus, if the maximum apex angle θ is increased to θ', the working distance D' is smaller than the working distance D, that is D>D'.

The sequence of operations when applying a focussing servo in the routine optical disc device is explained with reference to FIGS. 2A to 2D.

First if the optical disc is set, the objective lens actuator moves in which the objective lens toward and away from the optical disc. In the actuator position shown at FIG. 2, the objective lens is at a position a furthest from the optical disc 100.

If the objective lens actuator causes the objective lens to be moved at a moderate speed in a direction approaching the optical disc 100, the reflection signals detected by a photodetector are increased progressively. At a time point when the focal length between the objective lens and the optical disc is less then a few μm, a negative signal starts to be generated for the focussing error signal shown in FIG. 2B. The position b of the actuator shown in FIG. 2A corresponds to the time point the negative focussing error signals start to be produced.

If, with the use of, for example, the astigmatic method, the objective lens is moved further closer to the optical disc, the focussing error signal, shown in FIG. 2B, reaches a locally maximum value, and subsequently starts to decrease. From this time on, the focussing error signals and the distance between the objective lens and the optical disc coincide with each other. Thus, when the reflected light volume signal exceeds a predetermined level, the focussing error signals are detected and the focussing servo loop is turned on when this signal reaches 0, in order to pull in the focussing servo.

At a position the focussing error signals reach zero, the reflection light volume detection signal, shown in FIG. 2C, becomes maximum. This position corresponding to the maximum reflection light volume detection signal corresponds to an actuator position c shown in FIG. 2A.

If the focussing servo has been pulled-in successfully, the feedback loop of the focussing servo including the focussing error signals is in operation. Thus, the objective lens is driven by the objective lens actuator so that the focussing error signals will be substantially equal to zero. In FIG. 2, the behavior of the respective signals is as shown by a solid line. This sequence of operations is termed the focussing search operation.

Among the family of recordable optical discs, there is a disc employing a phase change material. A mark which serves as data is produced by forming a crystal area and an amorphous area by controlling the laser light power. The reflectance of the crystal area is approximately 20%, while that of the amorphous area is approximately 0.6%. The mark can be discerned by this difference in reflectance. The average data surface reflectance is of the order of approximately 10% which is not vitally different from the surface reflectance of the optical disc which is approximately 6 to 7%.

If the objective lens is actuated in order to pull in the focussing servo, two similar reflection and focussing error signals are produced. For focussing pull-in on the data surface, there is required a method to make distinction between these two signals. If the disc surface of the optical disc is close to the signal recording surface and the focussing servo pull-in has failed, there is a risk of the objective lens colliding against the disc surface.

If the objective lens is actuated from the surface towards the data surface in order to detect the focussing servo pull-in range, there may be contemplated a method of detecting the second focussing error signal.

However, if the optical disc surface is scratched or dust and dirt are deposited thereon, signals cannot be detected correctly, such that the discrimination and hence the focussing servo pull-in results in failure to lead to collision of the optical disc against the objective lens as in the case of the above-mentioned failure in focussing servo pull-in. On the other hand, if vibrations are applied to the device from outside, such that the objective lens undergoes vibrations in the vicinity of the optical disc surface, signal chattering is produced to lead to mistaken focussing servo pull-in on the optical disc surface.

SUMMARY OF THE INVENTION

It is therefore an object of the present invention to provide a method and apparatus for recording/reproducing an optical disc which evades focussing servo pull-in on an incorrect surface.

In one aspect, the present invention provides an optical disc apparatus for recording and/or reproducing information signals for an optical disc including an optical pickup including an objective lens arranged facing the optical disc for converging and illuminating the laser light on a signal recording surface of the optical disc and objective lens driving means for driving the objective lens at least in a direction perpendicular to the signal recording surface, displacement signal generating means for generating from the return laser light illuminated by the objective lens to the optical disc a displacement signal corresponding to displacement of a converging point of the laser light from the signal recording surface in the perpendicular direction, servo means for driving and controlling the objective lens by the objective lens driving means in the perpendicular direction, based on the displacement signal from the displacement signal generating means, so that the converging point will be on a signal recording surface of the optical disc, and permission signal outputting means for outputting a permission signal for according permission of the servo operation to the servo means when the objective lens position detected by the position detection means is within a pre-set range.

That is, with the present optical disc recording/reproducing apparatus, it is possible to avoid collision of the optical disc against the objective lens even if the focussing pull-in results in failure under the effect of flaws or dust and dirt on the optical disc surface or disturbances of the vibratory nature in the course of the focussing servo operation, thus preventing optical disc damage to enable correct data reproduction. If, under the effect of the above-mentioned obstructive factors, the focussing servo pull-in range is difficult to discern as in the case of the phase-change disc, it is possible to evade erroneous focussing servo pull-in to the superficial optical disc surface. Thus, there is provided an optical disc recording/reproducing apparatus having a small working distance and which can achieve high density recording.

In another aspect, the present invention provides a method for recording/reproducing information signals for an optical disc using an optical pickup including an objective lens arranged facing the optical disc for converging and illuminating the laser light on a signal recording surface of the optical disc and objective lens driving means for driving the objective lens at least in a direction perpendicular to the signal recording surface, displacement signal generating means for generating from the return laser light illuminated by the objective lens to the optical disc a displacement signal corresponding to displacement of a converging point of the laser light from the signal recording surface in the perpendicular direction and servo means for driving and controlling the objective lens by the objective lens driving means in the perpendicular direction, based on the displacement signal from the displacement signal generating means, so that the converging point will be on a signal recording surface of the optical disc. The method includes a step of detecting the state between the objective lens and the optical disc, a step of the servo operation responsive to a signal from the detection means., and a step of outputting a permission signal for according permission of the servo operations to the servo means when the objective lens position detected by a position detection means is within the pre-set range.

In yet another aspect, the present invention provides an optical disc apparatus including an objective lens driving means for driving the objective lens in a direction perpendicular to a signal recording surface of the optical disc, impact detection means for detecting an impact from outside and control means for controlling the objective lens driving means responsive to the strength of the impact detected by the impact detection means during the focussing servo pull-in operation to avoid collision of the objective lens against the optical disc.

Thus, with the optical disc apparatus, the objective lens driving means is controlled by control means, responsive to the strength of an impact as detected by the impact detection means, in order to avoid collision of the objective lens against the optical disc.

Also, in the objective lens driving control methods according to the present invention, the operation of avoiding collision of the objective lens against the optical disc is performed responsive to the strength of the impact from outside, as detected by the impact detection means, in order to avoid collision of the objective lens against the optical disc.

Thus, with the optical disc recording/reproducing apparatus, there is provided a sensor for measuring the position of the optical lens with respect to the objective disc and a permission signal for executing the focussing pull-in operation is issued when the value of the sensor output is within a preset range in order to avoid focussing pull-in to the disc surface. Moreover, if the value exceeds a pre-set range, the approaching operation is discontinued to prevent collision of the objective lens against the optical disc.

Also, with the optical disc recording/reproducing method according to the present invention, a permission signal for executing the focussing pull-in operation is issued when the value of the output of the sensor used for measuring the distance between the objective lens and the optical disc is within a preset:range to prevent the pull-in of the focussing servo to the inappropriate optical disc surface and, if the value exceeds the preset range, the approaching operation is discontinued to prevent collision of the objective lens against the optical disc in the course of the focussing search operation.

BRIEF DESCRIPTION OF THE DRAWINGS

FIGS. 2A to 2D are timing charts showing signals of respective portion at the time of conventional focussing servo pull-in.

FIGS. 6A to 6F are timing charts showing signals of various portions at the time of focussing servo pull-in.

FIGS. 7A to 7F are timing charts showing signals of various portions in case wherein signal detection has not been enabled at the time of focussing servo pull-in.

FIGS. 11A and 11B are graphs showing the operation of a biaxial actuator on impact application from outside during the focussing servo pull-in operation.

DESCRIPTION OF THE PREFERRED EMBODIMENTS

Figure 1A:
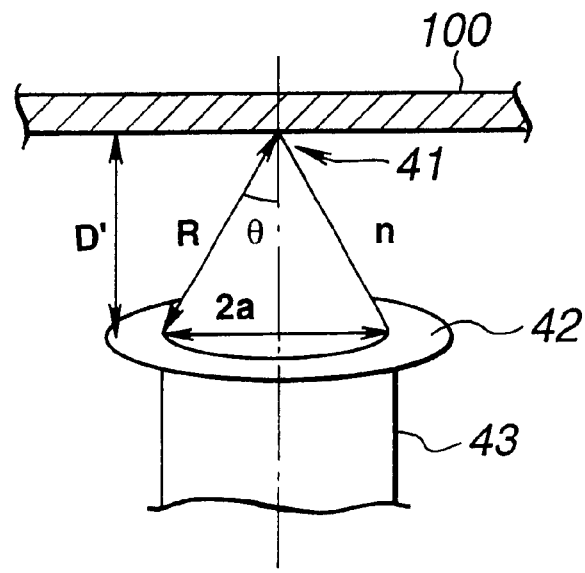
FIGS. 1A and 1B are schematic views showing the relation between the aperture ratio and a working distance.
Figure 1B:
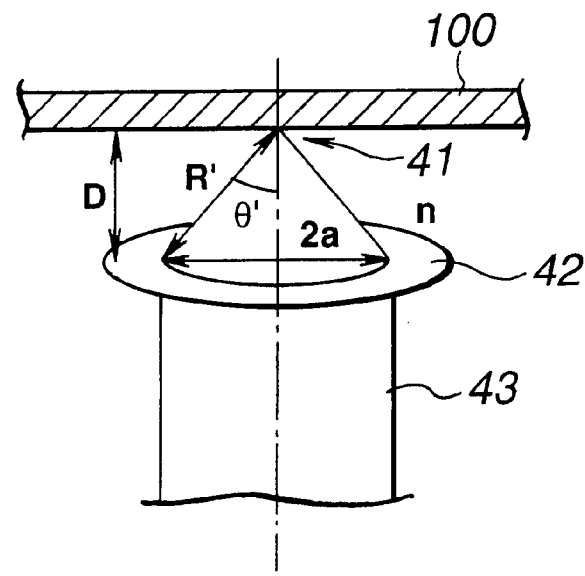
Figures 2A, 2B, 2C, 2D:
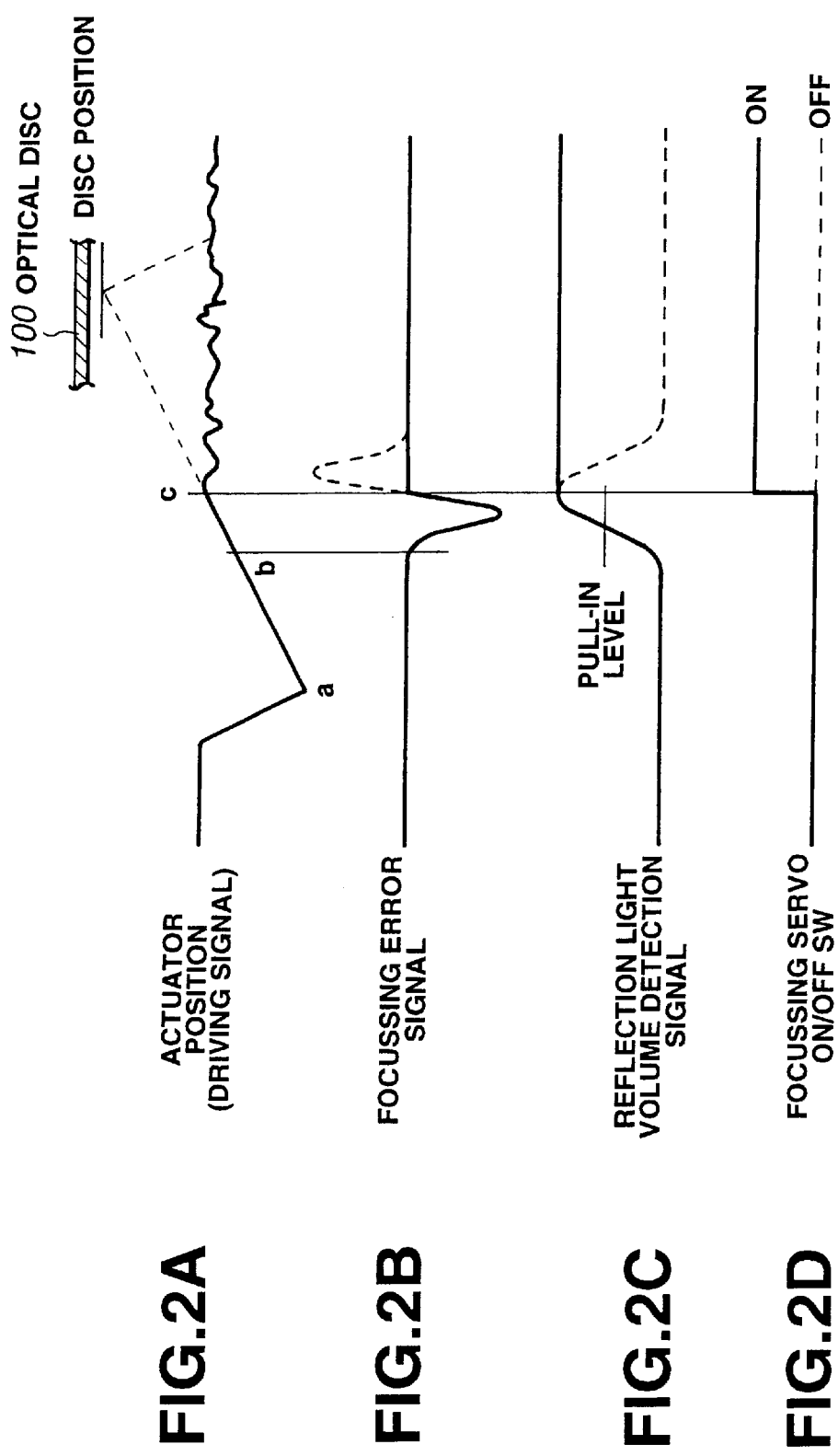

Referring to the drawings, preferred embodiments of the present invention will be explained in detail.

Figure 3:
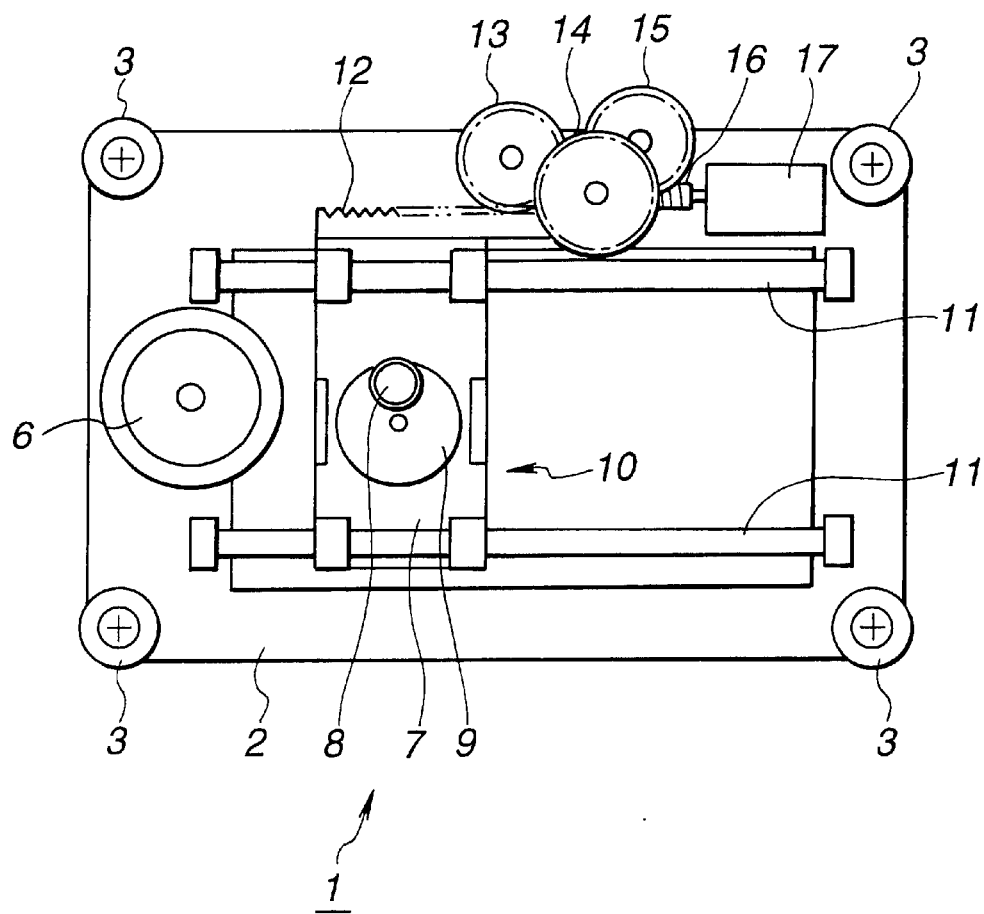
FIG. 3 is a plan view showing the schematic structure of an optical disc recording/reproducing apparatus.
Figure 4:
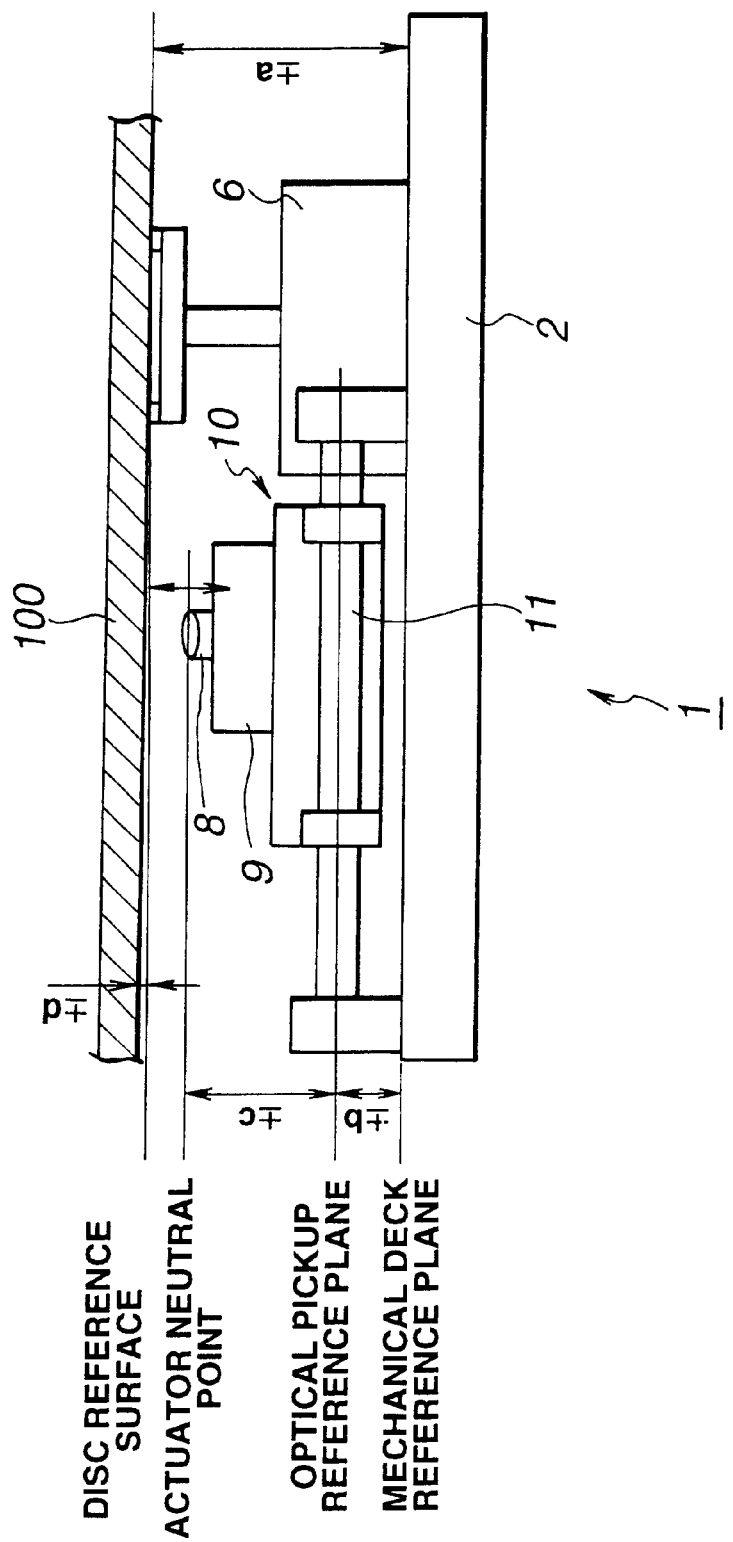
FIG. 4 is a side view of an optical disc device used for illustrating the setting of a limiter value.

Referring to FIGS. 3 and 4, an optical disc reproducing device 1 includes an objective lens 8 for converging the laser light emitted from a laser light source, not shown, to a signal recording surface of the optical disc 100, and a biaxial actuator 9 as an objective lens driving actuating means for driving the objective lens 8 in two directions, that is in a direction perpendicular to the signal recording surface of the optical disc 100 and in a direction perpendicular to the recording track of the optical disc.

The optical disc reproducing device also includes a substantially rectangular mechanical deck 2, shock-proofing insulators 3 mounted on the corners of the mechanical deck 2 for absorbing any shock applied from outside, and a spindle motor 6 for rotationally driving the optical disc. The optical disc reproducing device 1 also includes an optical pickup 10 comprised of a pickup base 7, the above-mentioned objective lens 8 and the above-mentioned biaxial actuator 9 set on the optical pickup base 7 and which is adapted for supporting the objective lens 8 for movement in the tracking direction and in the focussing direction with respect to the optical disc 100. The optical disc reproducing device finally includes a pair of feed shafts 11 for supporting the pickup base 7 for movement radially over the optical disc 100 during rotation of the spindle motor 6, and a feed driving unit 18 constituted by a feed rack 12, a driving gear 13, a counter gear 14, a transmission gear 15, a worm gear 16 and a feed motor 17 and which is adapted for causing movement of the pickup base 7 supported by the feed shafts 11, 11 for movement radially over the optical disc 100.

During reproduction, the above-described optical disc reproducing device feeds the optical pickup 10 by the feed driving unit 18 up to a desired track on the optical disc 100. Specifically, the rotational driving force of the feed motor 7 is transmitted through the worm gear 16, transmission gear 15, counter gear 14, driving gear 13 and thence through the feed rack 12, so that the optical pickup 10 is moved on the feed shafts 11.

The optical disc reproducing device 1 focusses the laser light from a laser light source arranged in the optical pickup 10 with the objective lens 8 on the signal recording surface of the optical disc 100 being rotated by the spindle motor 6. The return light from the optical disc 100 is detected by a photodetector, not shown. Based on this detected light, tracking error signals are produced, which represent displacement signals in the perpendicular direction to the recording track on the signal recording surface of the optical disc 100.

It is noted that the focussing of the laser light on the signal recording surface of the optical disc 100 is enabled of the servo operations by the tracking servo and the focussing servo. The biaxial actuator 9 drives the objective lens 8 in the tracking direction and in the focussing direction to effectuate the tracking servo and the focussing servo.

The servo operations are enabled by the focussing servo pull-in operation. The actuator driving circuit of the first embodiment relevant to the focussing servo pull-in operation is shown in FIG. 5.

Figure 5:
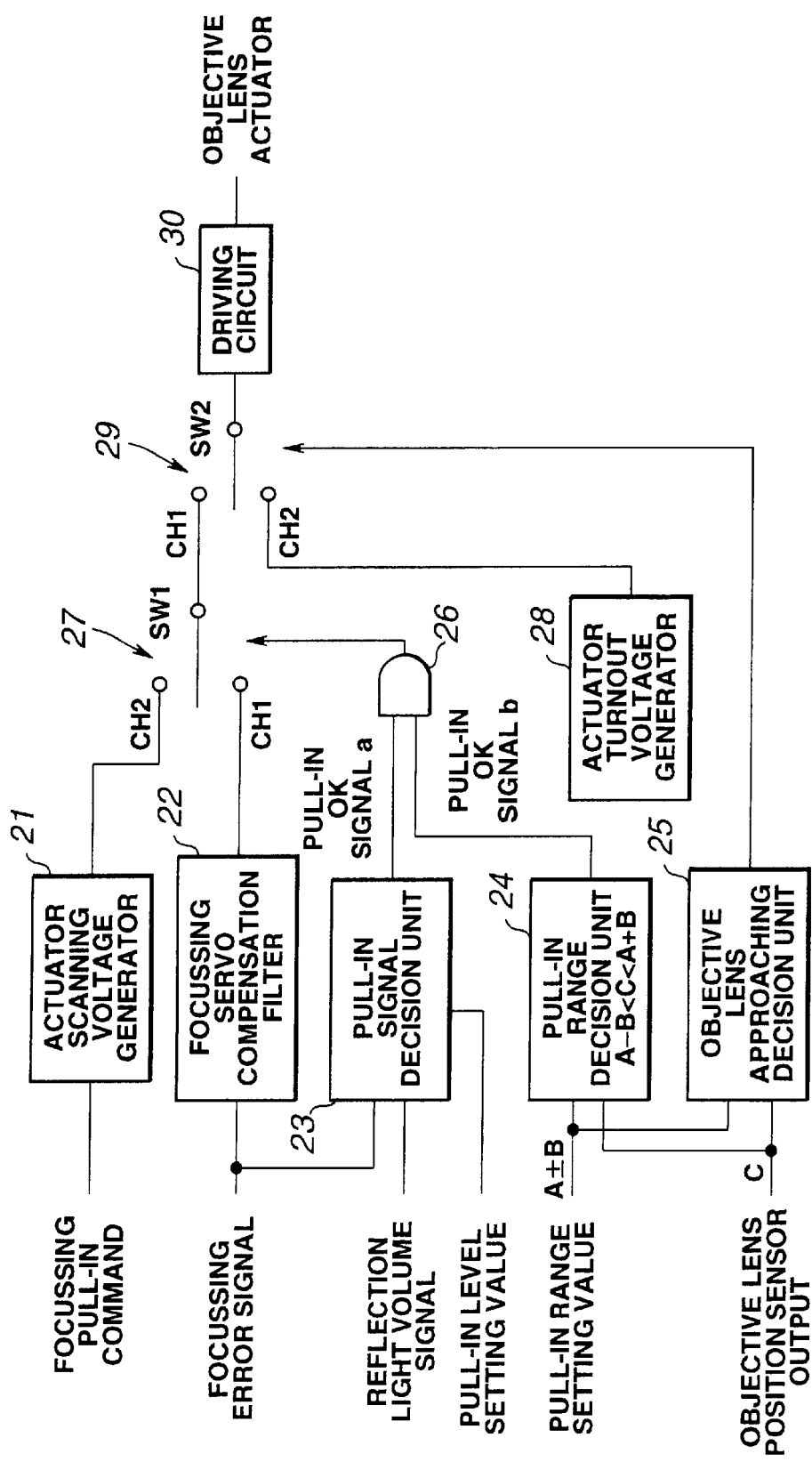
FIG. 5 is a block diagram showing the structure of various circuit portions of the optical disc recording/reproducing apparatus.

The actuator driving circuit of FIG. 5 includes an actuator voltage generator 21 for generating the actuator actuating voltage from a focussing pull-in command and a focussing servo compensation filter 22 for filtering the focussing error signals for focussing servo compensation. The actuator driving circuit also includes a pull-in signal decision unit 23 for checking a pull-in signal based on a reflection light volume signal from the photodetector and a pre-set pull-in level setting value and a pull-in range decision unit 24 for checking the pull-in range based on an inequality $$A-B<C<A+B$$

from the pull-in range setting value of $A\pm B$ and an output C of an objective lens position sensor as position detection means. The actuator driving circuit also includes an objective lens approaching decision unit 25 for checking the approach of the objective lens based on an inequality $$A+B<C$$

from the pull-in range setting value of $A\pm B$ and the objective lens position sensor output.

The actuator driving circuit also includes an AND gate 26 for ANDing a first pull-in OK signal a from the pull-in signal decision unit 23 and a second pull-in OK signal b which is a permission signal sent from the pull-in range decision unit 24 to issue a focussing pull-in control signal, and an actuator retreating voltage generator 28 for generating an actuator retreating voltage. The actuator driving circuit also includes a first switch 27 receiving an actuator scanning voltage from the actuator voltage generator 21 and a signal from the focussing servo compensation filter 22 at a second terminal CH2 and at a first terminal CH1, respectively, to select one of the first terminal CH1 and the second terminal CH2 responsive to a focussing pull-in control signal from the AND gate 26, and a second switch 29 receiving a signal from the first switch 27 and the actuator retreating voltage from the actuator retreating voltage generator 28 at the first terminal CH1 and at the second terminal CH2 respectively, to select one of the first terminal CH1 and the second terminal CH2 responsive to a signal from the objective lens approaching decision unit 25. The actuator driving circuit finally includes a driving circuit 30 responsive to a signal from the second switch 29 to drive the biaxial actuator.

The operation of the present circuit is hereinafter explained by referring to signals of various portions shown in FIG. 6.

On occurrence of a focussing servo pull-in operation command, which is a command for starting a sequence of focussing servo pull-in operations for an optical disc, the biaxial actuator starts to be driven by the actuator voltage generator 21. The actuator scanning voltage, generated by the actuator voltage generator 21, is transiently lowered and subsequently increased with lapse of time, as shown in FIG. 6A. In keeping therewith, the objective lens is transiently moved to a predetermined position in the focussing direction in a direction away from the optical disc and then gradually approaches the optical disc.

If the pull-in signal decision unit 23 verifies that the reflection light volume signal shown in FIG. 6C has exceeded a predetermined pull-in level setting value, it proceeds to detect zero-crossing of the focussing error signals shown in FIG. 6B. On detection of the zero level, the pull-in signal decision unit 23 outputs a high level as the first pull-in OK signal a shown in FIG. 6D. This first pull-in OK signal a goes to a low level if the reflection light volume signal is lower than the pull-in level.

If the objective lens position sensor output C is in the pull-in range sensor setting range A±B, the pull-in range decision unit 24 outputs a high level as a second pull-in OK signal b. That is, if the objective lens position sensor output C is in a range which satisfies the relation $$A-B<C<A+B$$

with respect to the pull-in range sensor setting range A±B, the second pull-in OK signal b, which is the permission signal shown in FIG. 6F, goes to a high level. Specifically, the servo pull-in on the disc surface is precluded.

If both the first pull-in OK signal a and the second pull-in OK signal b are both of the high level, the focussing pull-in signal from the AND gate 26 goes to a high level, as a result of the AND operation. Thus, the first switch 27 closes the first terminal CH1 side so that there will be completed a focussing servo loop comprised of focussing error signals, focussing servo compensation filter 22 and the objective lens actuator driving. At this time, an output of the objective lens approaching decision unit 25 goes low to control the second switch 29 to close the first terminal CH1 side.

The focussing error signals conforming to surface deviation of the optical disc are subsequently feedback-controlled so that the laser light illuminated on the optical disc from the objective lens will be perpetually focussed on the signal recording surface.

In the present optical disc recording/reproducing device, since pull-in occurs only during the high-level period of the second pull-in OK signal b of the pull-in range decision unit 24 employing the objective lens position sensor output, the first pull-in signal a on the optical disc surface is masked, as shown in FIG. 6, so that there is no risk of the pull-in operation causing the objective lens to contact the disc surface.

The first pull-in signal a shown in FIG. 6D going high by the reflection light volume signal of FIG. 6C exceeding the pull-in level, with the focussing error signals of FIG. 6B crossing the zero, is occasionally ascribable to reflection from the optical disc surface and from the recording surface.

Since here the second pull-in OK signal b is set to a high level when the objective lens position sensor output shown in FIG. 6E is in a pre-set range and the focussing pull-in control signal is produced only if the first pull-in signal a and the second pull-in OK signal b as a permission signal are both at a high level in order to effectuate pull-in, it is possible to prohibit pull-in by surface reflection to effectuate pull-in only for reflection on the recording surface.

In addition, signal chattering on the optical disc surface can be eliminated since the result of the decision of the pull-in signal decision unit 23 is not of the high level even on occurrence of such signal chattering.

The pull-in range sensor setting value A can be found from the objective lens reference position of focussing servo application, using a reference optical disc at the time of assembling and preparation of the device. The value of the range B is set taking into account the sensor detection error or surface deviations of the optical disc.

Thus, the optical disc recording/reproducing device, operates the focussing servo based on the focussing error signals produced on approaching the objective lens to the optical disc under a controlled actuator voltage, includes means for measuring the distance between the objective lens and the optical disc or the objective lens position. The optical disc recording/reproducing device effectuates a focussing pull-in operation when the value obtained by these means is within a preset range, while discontinuing the approaching operation if the above value exceeds the pre-set range.

FIG. 7 shows the waveform of the focussing pull-in operation in case of failure in signal detection due to presence of scratches or dust and dirt on the optical disc surface.

If there exist dust and dirt or flaws on the optical disc surface, signals used for decision of the pull-in range cannot be produced. Also, there are occasions wherein an impact is applied from outside in the course of the operations, with the vibration level exceeding the allowable range for the focussing servo.

The actuator scanning operation occurs in accordance with the objective lens actuator driving signals shown in FIG. 7A, such that the second pull-in OK signal b shown in FIG. 7F goes high in the pull-in range decision unit. However, due to the effect of the dust and dirt or flaws on the optical disc surface, the focussing error signals of FIG. 7B or the reflection light volume signals of FIG. 7C, which should inherently be produced as indicated by broken lines, cannot be produced.

The result is that the first pull-in signal a of FIG. 7D is not high in the pull-in range decision unit so that a point for which pull-in should occur is passed through in the course of scanning so that scanning is continued until collision against the optical disc results in the case of the conventional optical disc device.

This means that, in case of failure of focussing servo pull-in during the focussing search operation, the objective lens collides against the optical disc in the conventional system. Since the optical disc is usually rotating during focussing servo pull-in, the optical disc is severely damaged if the objective lens collides against the optical disc to render correct data reproduction difficult.

However, with the present optical disc recording/reproducing device, if the objective lens position sensor output C exceeds the pull-in range setting value A+B, a high-level output is issued from the objective lens approaching decision unit and hence the second switch SW2 is set to the second terminal CH2 so that a retreating voltage is outputted by the actuator retreating voltage generator 28. The result is retreating of collision against the optical disc even on occurrence of a situation of failure of signal generation during the focussing pull-in operation.

Similarly, in case of failure of focussing servo pull-in due to application of a vibrational impact to the device from outside, this failure is detected by the objective lens approaching decision unit 25 to prevent collision against the optical disc. If the objective lens position sensor output C exceeds the upper limit A+B of the pull-in range, that is if the inequality A+B>C is met, the objective lens approaching decision unit 25 outputs a high level signal to cause the second switch 29 to select an output of the actuator retreating voltage generator 28.

The position sensor for detecting the objective lens position is explained. This position sensor is configured as an objective lens position detection sensor for detecting the position of the objective lens relative to the optical disc.

Figure 8A:
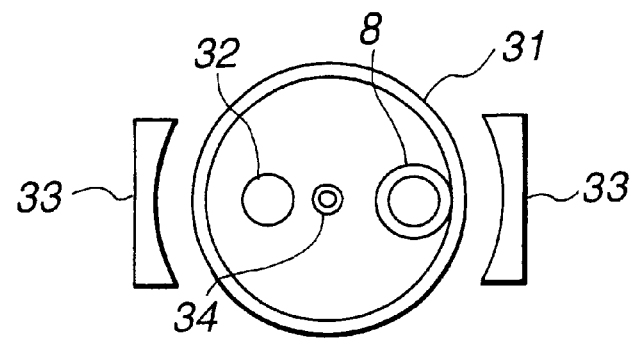
FIGS. 8A and 8B are a plan view and a front view respectively showing a first example of an objective lens position sensor mounted on an optical pickup.
Figure 8B:
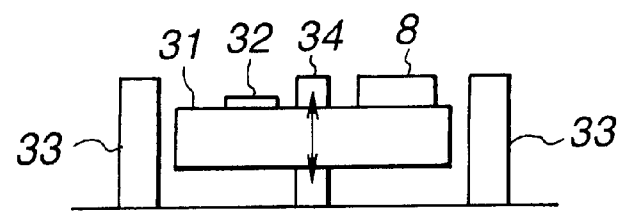

A first embodiment of the position sensor is configured as shown for example in FIGS. 8A and 8B. In the present position sensor, a sensor lens 32 is arranged on a surface of the biaxial actuator 9 carrying the objective lens 8 at a diametrically opposite side of the objective lens 8 with respect to a shaft 34.

That is, the sensor lens 32 is mounted on the same biaxial actuator 9 as that carrying the objective lens 8. The distance between the optical disc and the objective lens can be measured directly because the sensor lens 32 is moved in keeping with the movement of the objective lens 8. The above distance is measured is by illuminating the light on the optical disc from a light projecting and receiving device via the sensor lens 32. The operation is realized by arranging a coil at a near-by position to constitute a magnetic circuit with a facing magnet 33.

Figure 9A:
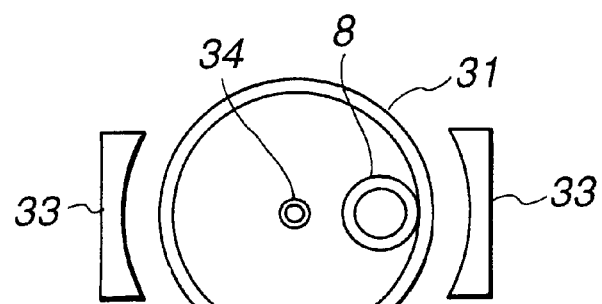
FIGS. 9A and 9B are a plan view and a front view respectively showing a second example of an objective lens position sensor mounted on an optical pickup.
Figure 9B:
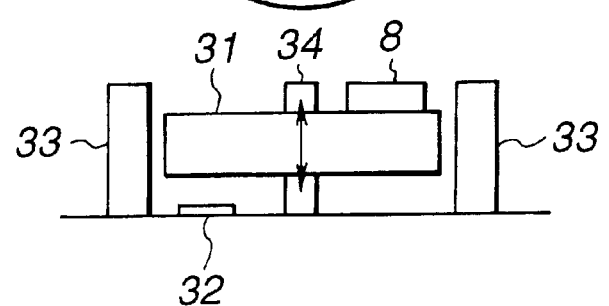

A second embodiment of the position sensor is shown in FIG. 9. In this position sensor, the sensor lens 32 is arranged on the major surface of the optical pickup facing the surface of the biaxial actuator 9 opposite to its surface carrying the objective lens 8. The position of the actuator carrying the objective lens is measured by an optical or magnetic sensor mounted in this manner on the optical pickup.

Figure 10:
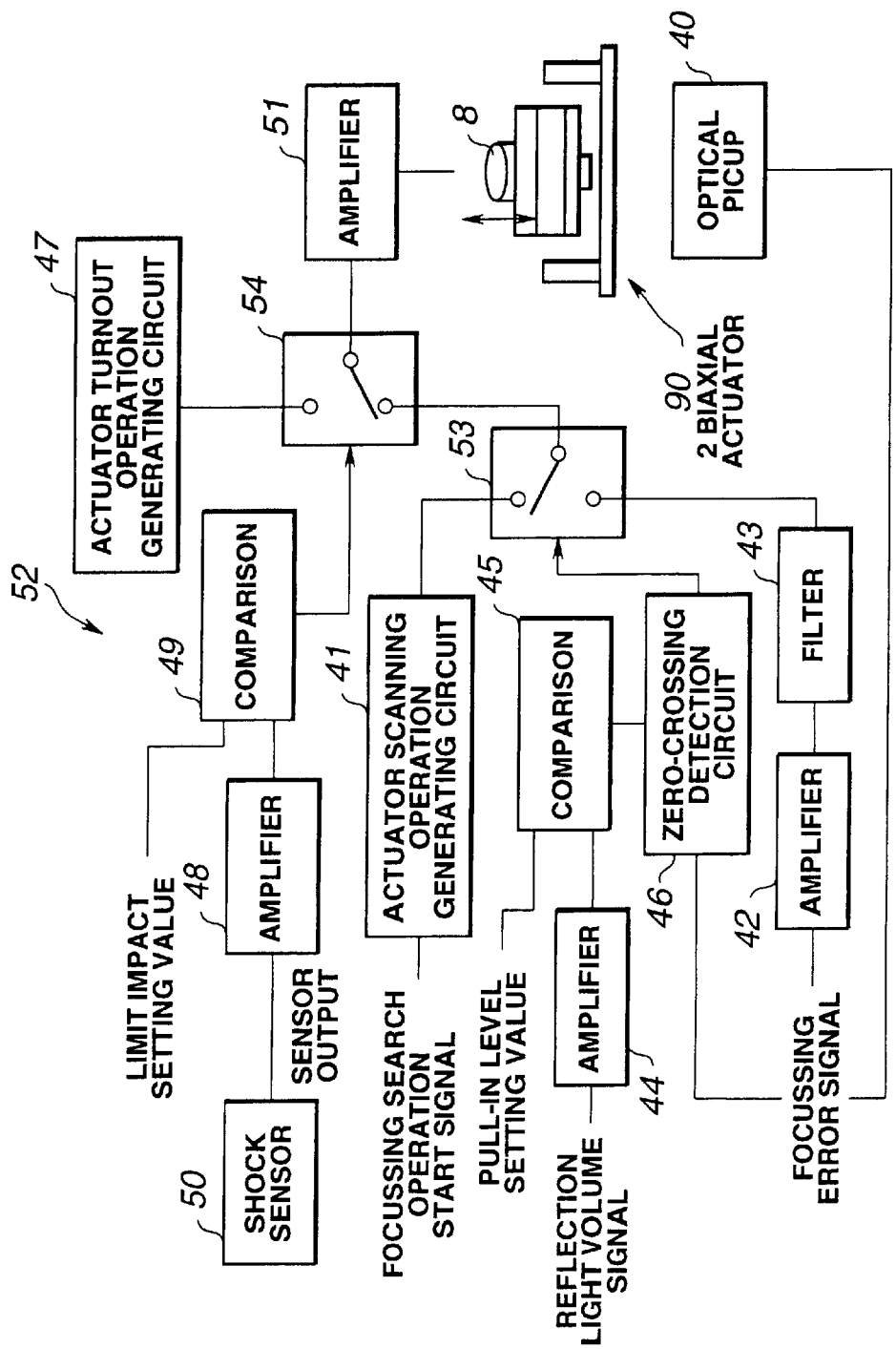
FIG. 10 is a block diagram showing a circuit structure of an actuator driving circuit of the optical disc reproducing apparatus.

A second embodiment of an actuator driving circuit, associated with the focussing servo pull-in operation, is arranged as shown in FIG. 10.

An actuator driving circuit of the optical disc reproducing device 1 includes an actuator scanning operation generating circuit 41 for starting the driving of a biaxial actuator 90 based on occurrence of a command for a focussing search operation by power up or disc exchange, an amplifier 42 for amplifying focussing error signals from the optical pickup 40 and a filter 43 for filtering the focussing error signals amplified by the amplifier 42, the amplifier 42 and the filter 43 constituting a focussing loop. The actuator driving circuit also includes another amplifier 44 for amplifying the reflection light volume signal and a comparator 45 for comparing the reflection light volume signal amplified by the amplifier 44 to a pull-in level setting value. The actuator driving circuit also includes a zero-crossing detection circuit 46 for detecting the zero-crossing of the focussing error signals and a first switch 53 turned on or off based on the results of comparison of the comparator 45 and which is adapted to send to a downstream side second switch 54 an output signal of the actuator scanning operation generator 41 or an output signal of the filter 43 constituting the feedback loop. The actuator driving circuit also includes an actuator retreating operation generator 47 for generating a signal driving the biaxial actuator 90 in a direction of retreating the objective lens 8 from the optical disc 100 and an amplifier 48 for amplifying an output signal of a shock sensor 50. The actuator driving circuit also includes a comparator 49 for comparing a preset threshold impact value to a signal from the shock sensor 50 amplified by the amplifier 48. Finally, the actuator driving circuit includes the second switch 54 turned on or off based on the result of the comparison by the comparator 49 and which is adapted to send to the downstream side amplifier 51 an output signal of the actuator retreating operation generator 47 or an output signal of the first switch 53.

With the optical disc reproducing device 1, the biaxial actuator 90 is driven by the driving signal outputted by the amplifier 51.

The above-mentioned controller 52 is made up of the amplifier 48, comparator 49, actuator retreating operation generator 47 and the second switch 54. During the focussing servo pull-in operation, the controller 52 controls the biaxial actuator 90 depending on the strength of the shock detected by the shock sensor 50 to perform an operation preventing collision of the objective lens 8 against the optical disc 100.

In the above-described structure of the actuator driving circuit, if a command for the focussing search operation is produced on power up or by optical disc exchange, the actuator scamming operation generator 41 drives the biaxial actuator 90 to start the focussing servo pull-in operation. That is, the biaxial actuator 90 is driven by the driving signal from the actuator scanning operation generator 41 entered via the first switch 53 and the second switch 54 to the amplifier 51.

In the focussing servo pull-in operation, the objective lens 8 is transiently moved to a defined position in a direction away from the optical disc 100 and then moved gradually in a direction of approaching the optical disc.

When the reflection light volume signal obtained by a light reception element, not shown, is found by the comparator 45 to have exceeded a pull-in level setting value, zero-crossing of the focussing error signals is detected by the zero-crossing detection circuit 46.

On detection of the zero-crossing, the focussing servo pull-in operation is terminated. The first switch 53 is then actuated so that the focussing servo loop made up of the amplifier 42 and the filter 43 will be turned on to transfer to the feedback control state for the focussing error signals responsive to e.g., surface deviation of the optical disc 100.

The state in which the shock sensor 50 has detected the impact in an course of the focussing servo pull-in operation is hereinafter explained.

During the focussing servo pull-in operation, a sensor output of the shock sensor 50 provided on the mechanical deck 2 is compared by the comparator 49 via amplifier 48 at all times to a pre-set limit impact value. For example, the shock sensor 50 detects the speed of the shock applied to the mechanical deck 2 to output a signal proportionate to the impact as an impact strength. For example, the limit impact value is determined as an output value issued by the shock sensor 50 when an impact is applied which will cause failure of focussing servo pull-in.

If a value exceeding the limit threshold is detected by the shock sensor 50, the second switch 54 is actuated to output a driving signal of the actuator retreating operation generator 47 to the biaxial actuator 90.

The actuator retreating operation generator 47 generates a driving signal for the biaxial actuator 90 to cause movement of the objective lens 8 in a direction away from the optical disc. The biaxial actuator 90, fed with the driving signal from the actuator retreating operation generator 47 by the above actuation of the second switch 54, is driven for causing movement of the objective lens 8 in a direction away from the optical disc 100.

That is, in the optical disc reproducing device 1, the shock sensor 50 senses an impact during the focussing servo pull-in operation and, if the strength of the impact reaches a predetermined magnitude, the objective lens 8 is retreated in a direction away from the optical disc.

Thus, if, in the present optical disc reproducing device, an impact is applied from outside in the course of the focussing servo pull-in operation, the objective lens 8 is retreated away from the optical disc 100 to prevent the objective lens 8 from colliding against the optical disc 100.

With the optical disc reproducing device, since only the shock sensor 50 is provided at a suitable position of the mechanical deck 2 and the comparator 49 is provided in association therewith, the favorable effect of preventing the objective lens 8 from colliding against the optical disc can be achieved at a low cost even if the operating sequence results in failure due to impact applied from outside during focussing servo pull-in operation.

FIG. 11B shows the post-comparison shock sensor signal, which is the output signal of the shock sensor 50 compared by the comparator 49. FIG. 11A shows, by a solid line, the change in the position of the objective lens 8 driven by the biaxial actuator 90 controlled by the results of the post-comparison shock sensor signal. Also, FIG. 11A shows, by a broken line, the movement of the objective lens 8 which is produced if the servo pull-in is not performed in the operating sequence of the focussing servo pull-in.

In the present optical disc reproducing device 1, the objective lens 8 is retreated away from the optical disc by the biaxial actuator 90 based on the results of comparison of the output of the shock sensor 50 to the above limit impact value.

An illustrative operation of the above-described focussing servo pull-in operation is explained with reference to FIGS. 12A to 12D which illustrate the sequence of operations of applying the focussing servo.

Figures 12A, 12B, 12C, 12D:
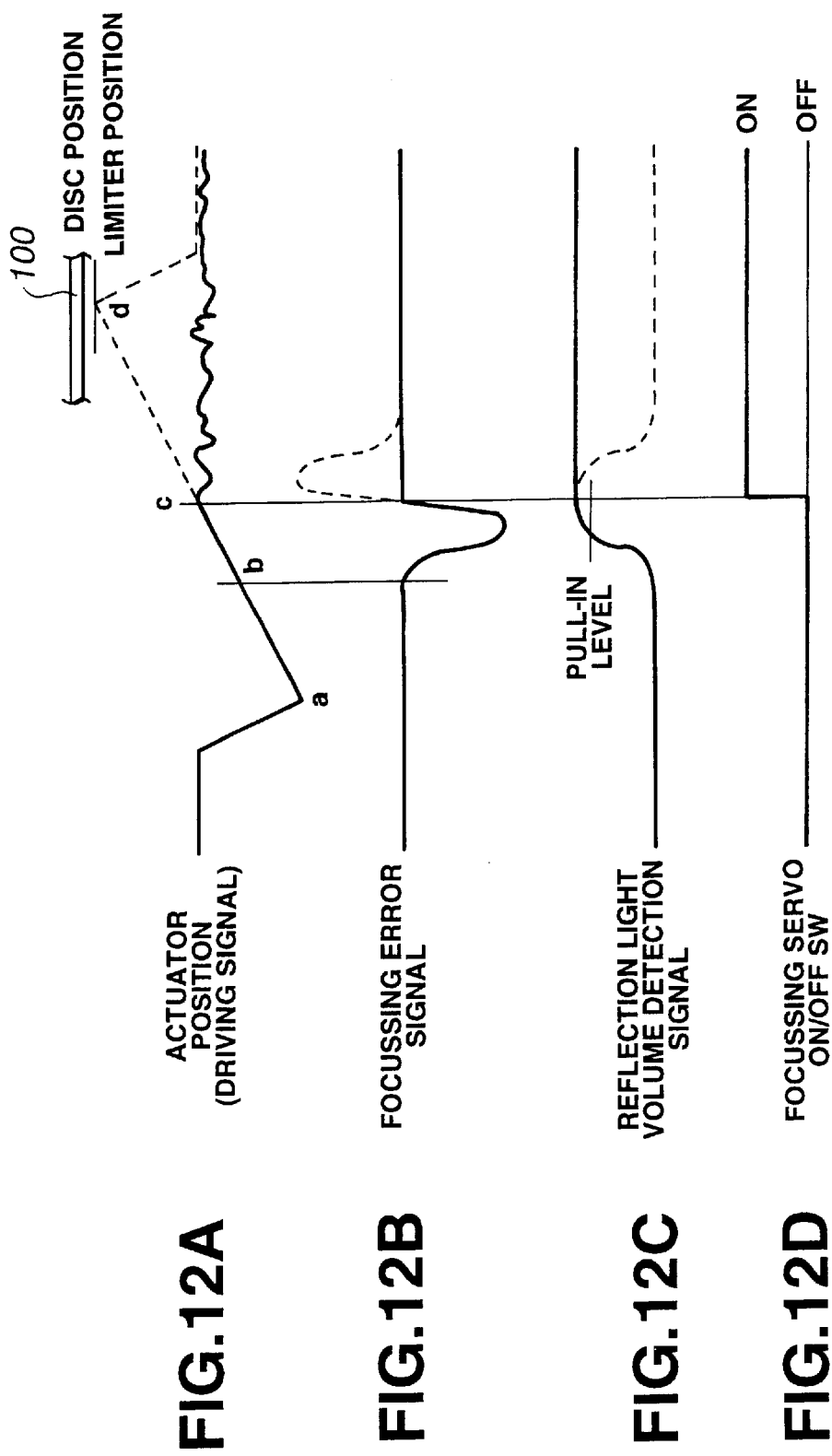
FIGS. 12A to 12D are graphs showing outputs of respective signals at the time of focussing servo pull-in operation.

FIG. 12B shows changes in the focussing signals accompanying changes in the actuator position (objective lens position) shown in FIG. 12A. FIG. 12C shows the manner in which the volume of light received by the light receiving element provided in the optical pickup 40 is changed with the actuator position shown in FIG. 12A. FIG. 12D shows the relation between the state of the on/off control of the focussing servo and the actuator position shown in FIG. 12A. In the drawing, the solid line shows changes in signals when the focussing servo pull-in is going on successfully, while a broken line shows changes in signals produced by an impact applied from outside.

When the optical disc 100 is set, the objective lens 8 is transiently moved by the biaxial actuator 90 in a direction away from the optical disc 100 (position a shown in FIG. 12A). If then the objective lens 8 is moved to approach to the optical disc 100 at a slow speed, the reflection signal detected by the light receiving element is increased gradually. If the distance between the objective lens 8 and the optical disc 100 is reduced to, for example, several $\mu$m or less, the focussing error signals start to be produced, as shown in FIG. 12B. The actuator position at this time is a position b in FIG. 12A. If, with the use of the astigmatic method, the objective lens 8 is approached further to the optical disc 100, the focussing error signal is transiently increased to a locally maximum value, after which it starts to be decreased, as shown in FIG. 12B.

After the focussing error signal is increased to the locally maximum value, the focussing error signal and the distance between the objective lens 8 and the optical disc 100 coincide with each other in polarity. Thus, when the reflection light volume signal is increased to a level higher than a pre-set value, the focussing error signal is detected and, in the vicinity of the signal equal to zero, the focussing servo loop is turned on to pull in the focussing servo (position c shown in FIG. 12A). At this time, the reflection light volume signal is maximum, as shown in FIG. 12C.

The foregoing is the focussing servo pull-in operation, following which the feedback loop of the focussing servo by the focussing error signal operates and hence the objective lens 8 is driven by the biaxial actuator 90 so that the focussing error signal will be approximately equal to zero.

If, while the focussing servo pull-in as described above is in operation, an impact is applied from outside, the optical disc reproducing device I performs the retreating operation of the objective lens 8 as described above. If, when the biaxial actuator 90 (objective lens 80) shown in FIG. 12A is at a position a to a position c corresponding to the focussing servo pull-in operation, an impact is applied from outside, the signal is raised by detection of the impact by the shock sensor 50, as shown in FIG. 11B, thus causing the retreating movement of the objective lens 8, as shown in FIG. 11A.

Also, the optical disc reproducing device 1 sets the limit voltage in case the objective lens 8 continues to approach to the optical disc 100 until the objective lens 8 reaches a limit position corresponding to a pre-set voltage across the biaxial actuator 90. This limit position is the position d reached by a trajectory of a broken line in FIG. 12A.

The limit position is the limit position that the objective lens can approach to the optical disc 100. This limit position can be set taking into account the variation in actuator sensitivity or in position errors in the initial position of the biaxial actuator 90 and in the position of the optical disc 100. The limit position is determined by application of a limited driving voltage to the biaxial actuator 90,r the so-called limit voltage.

Referring to FIG. 12, the setting of the above-mentioned limit voltage is shown by $$\text{limit voltage} = ((a+b+c)/(\text{minimum value of the actuator sensitivity taking into account the actuator sensitivity})) + \alpha \quad (2)$$

where a is a position error of the distance between the reference surface of the mechanical deck 2 and the reference surface of the optical disc 100, b is a position error between the reference surface of the mechanical deck 2 and the mounting reference of the optical pickup 10, c is a position error between the reference surface of the optical pickup 10 and a neutral point of the biaxial actuator 9, d is the position error between the reference surface of the optical disc 100 and the actual optical disc and $\alpha$ is a pre-set constant.

If a system is considered in which, in high density recording, the distance between the surface of the optical disc 100 and the objective lens 80, that is the above-mentioned distance WD, is reduced, the disc surface position is surpassed in case the position of the objective lens for the limit voltage is larger than the distance WD. This means that, in case of failure in the focussing servo pull-in during the focussing search operation, the objective lens 8 collides against the optical disc 100 in the conventional system.

However, this collision between the objective lens 8 and the optical disc 100 due to failure in focussing servo pull-in can be prevented by forcibly retreating the objective lens 8 from the optical disc 100 on impact detection as described above.

Meanwhile, by re-setting the limit position to a small value in consideration of the above distance WD, it is possible to prevent collision of the objective lens 8 against the optical disc 109 during focussing servo pull-in. It is also of course possible in this case to prevent vibration and direct collision against the optical disc 100 of the objective lens 8.

Thus, it is possible with the present invention to prevent effectively the collision of the objective lens 8 and the optical disc 100 due to shock from outside which is produced in the course of the focussing servo pull-in to obstruct the operation such as the above-described servo operation.

Meanwhile, a plurality of shock sensors may be provided on the optical disc reproducing device 1. This enables the optical disc reproducing device 1 to perform the above-described retreating operations of the objective lens 8 based on output values of the plural shock sensors.

A third embodiment of the present invention is explained.

Figure 13:
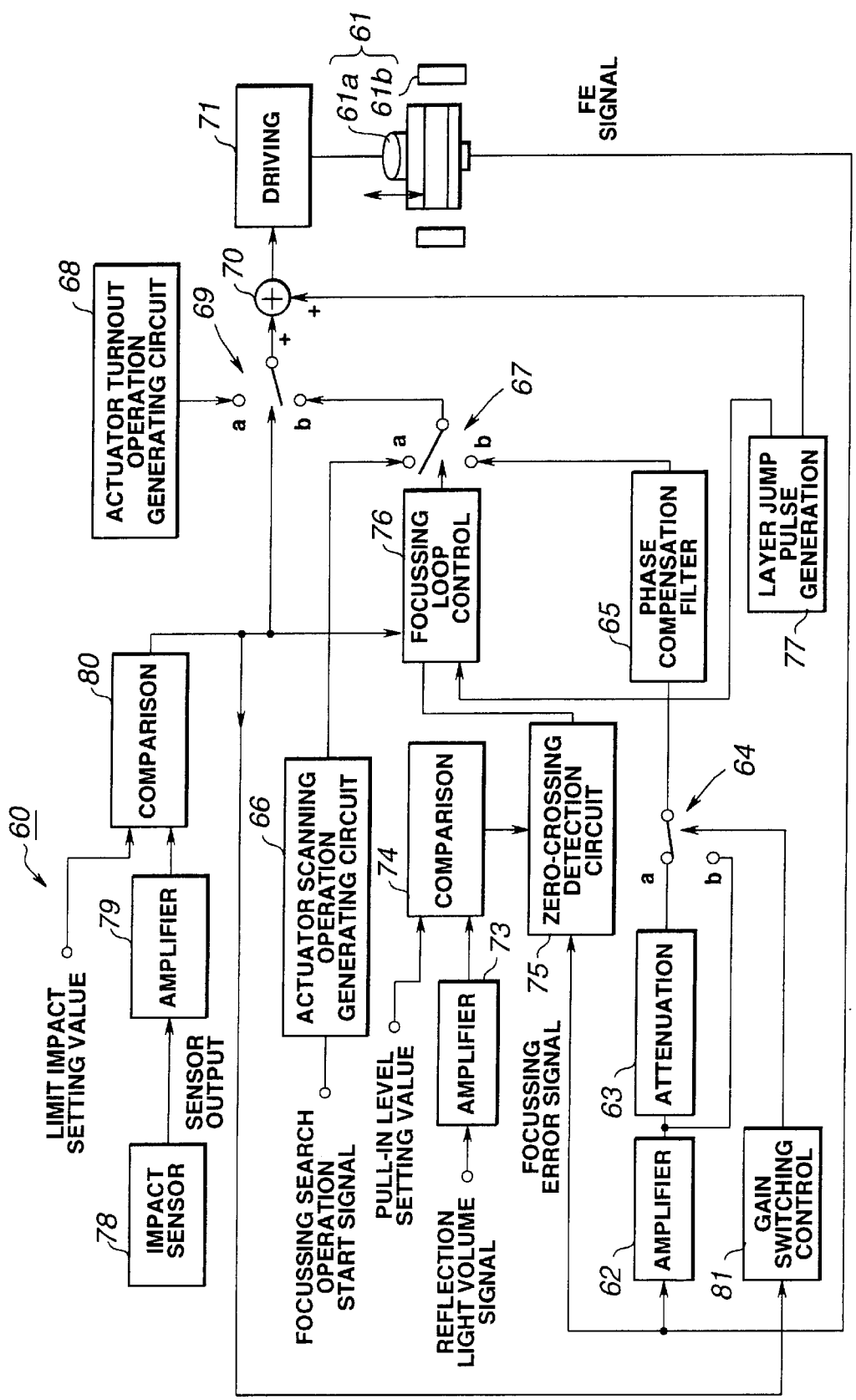
FIG. 13 is a block diagram showing the structure of an optical disc apparatus according to a third embodiment of the present invention.
Figure 14:
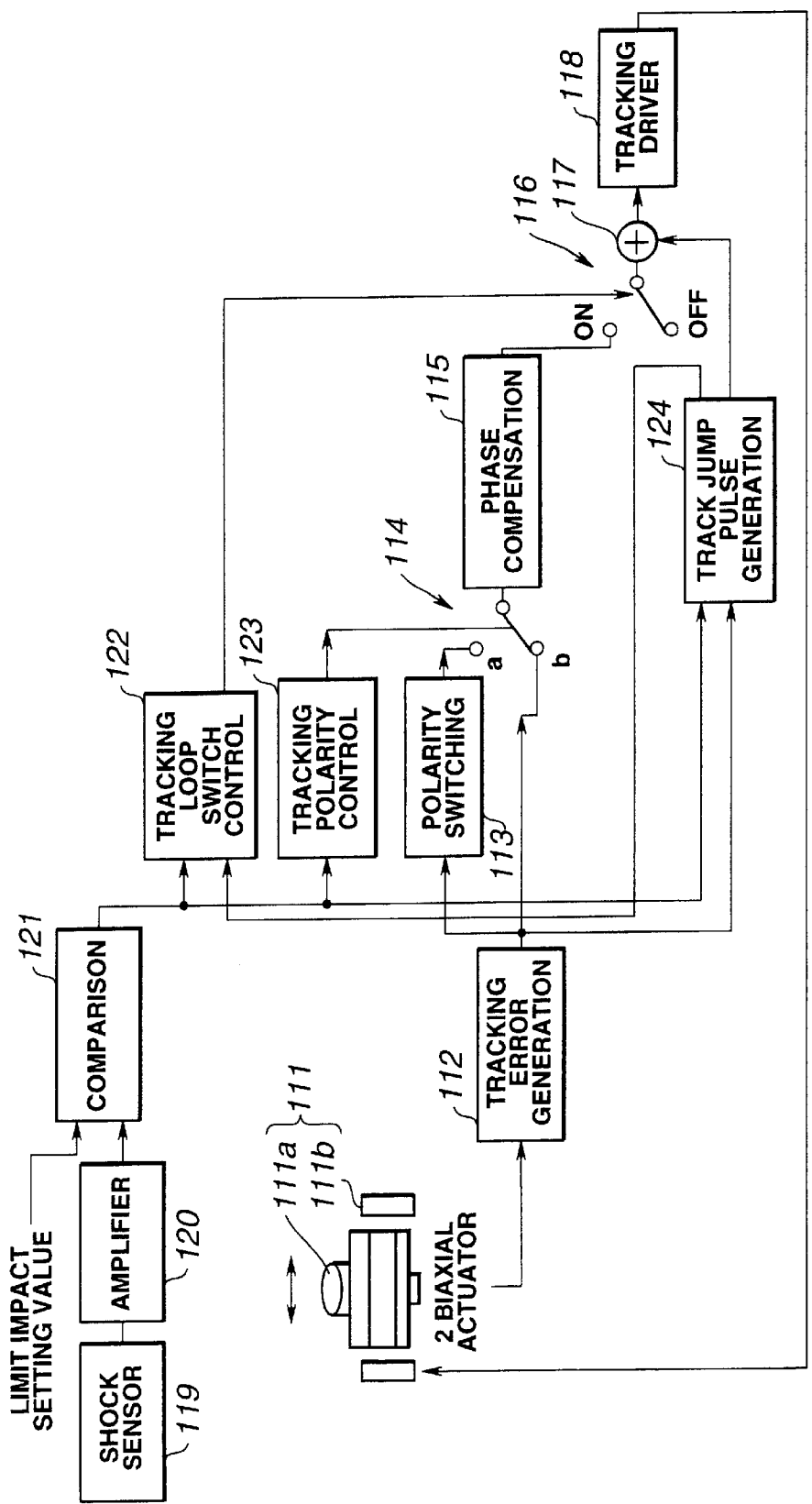
FIG. 14 is a block diagram showing the structure of an optical disc apparatus according to a fourth embodiment of the present invention.

The present embodiment is the optical disc device of the first embodiment to which is to added the layer jump function and the gain decreasing finction during high speed seek. The result is an optical disc device 60 shown in FIG. 13. This optical disc device 60 records/reproduces data for the multi-layered optical disc.

This optical disc device 60 includes an optical head 61, an attenuation circuit 63 for decreasing the gain of the focussing error signals (FE signals) sent from an amplifier 62, a first switching circuit 64 for switching the gain decrease, a phase compensation filter 65 for phase-compensating the FE signals, an actuator scanning operation generating circuit 66 for effectuating focussing search, a second switching circuit 67 for switching on/off of the focussing servo loop, an actuator retreating operation generation circuit 68 for effectuating a retreating operation on application of impact, and a third switching circuit 69. The optical disc device 60 also includes an adder 70 for summing layer jump pulses and a driving circuit 71 for driving a biaxial actuator 61b as later explained.

The optical head 61 includes an objective lens 61a and the biaxial actuator 61b for driving the objective lens 61a in the tracking and focussing directions, and generates FE signals based on the reflected light beam from the optical disc 100 to send the FE signals to the amplifier 62 and to a zero-crossing circuit 75 as later explained.

The amplifier 62 amplifies the FE signals to send the amplified signals to the attenuation circuit 63 and to a terminal a of the first switching circuit 64. The attenuation circuit 63 attenuates the FE signals to decrease the gain of the FE signals to send the attenuated FE signals to a terminal a of the first switching circuit 64.

The first switching circuit 64 is changed over by a gain switching control circuit 81 to send the FE signals sent to the terminals a or b to the phase compensation filter 65. The gain switching control circuit 81 sets the first switching circuit 64 to the terminals b or a for normal operation and only during high-speed seek, respectively.

The phase compensation filter 65 phase-compensates the FE signals to send the phase-compensated FE signals to a terminal b of the second switching circuit 67. On the other hand, if a focussing search start command is sent from a system controller, not shown, the actuator scanning operation generating circuit 66 generates a driving signal, shown in FIG. 5A, to send the generated driving signal to a terminal a of the second switching circuit 67.

The second switching circuit 67 is changed over by a focussing loop control circuit 76. Specifically, the focussing loop control circuit 76 sets the second switching circuit 67 to the terminal a during focussing search, while setting the second switching circuit 67 to the terminal b to send the signal at the terminal b to the terminal b of the third switching circuit 69 in case the focussing servo is applied. Thus, the optical head 61 is driven by the driving signals and by the FE signals during focussing search and during focussing servo, respectively.

The optical disc device 60 includes a comparator 74 for comparing the reflection light volume signal from the optical head 61 amplified by the amplifier 73 to a pre-set pull-in level setting value and the zero-crossing circuit 75 for detecting the zero-crossing of the FE signals. During focussing search, the comparator 74 starts pull-in when the reflection light volume signal from the optical head 61 exceeds the pull-in setting value to allow the zero-crossing circuit 75 to start zero-crossing detection. When the zero-crossing circuit 75 detects the zero-crossing of the FE signals, the focussing loop control circuit 76 re-sets the second.,switching circuit 67 from the terminal a to the terminal b. This completes the focussing loop.

The third switching circuit 69 is set to the terminal a or to the terminal b based on the impact limit signal from the comparator 80. The comparator 80 compares the impact value from outside, amplified by the amplifier 79, to a pre-set limit impact value and, if it is the impact from outside that is lager, the comparator sends to the third switching circuit 69 an impact limit signal signifying that effect. The third switching circuit 69, usually set to the terminal b, is set to the terminal a if the above impact limit value is supplied. The third switching circuit 69 sends the signal at the terminal a or b via adder 70 to the driving circuit 71.

The optical disc device 60 also includes a layer jump pulse generator 77 for generating a layer jump pulse when switching (layer-jumping) between plural-layers of the multi-layered optical disc 100 illuminated by the light beam. At the layer-jumping time, the layer jump pulse generator 77 sends the layer jump pulses to the adder 70, while turning off the focussing servo loop via the focussing loop control circuit 76. Thus, the driving circuit 71 controls the optical head 61 in order to perform layer jump based on the layer jump pulses.

During high-speed jump, the gain switching control circuit 81 of the optical disc device 60 sets the first switching circuit 64 to the terminal a to decrease the gain of the FE signals to complete the focussing servo loop.

If a large impact is applied to the optical disc device 60, the comparator 80 sends to the gain switching control circuit 81 an impact limit signal indicating that an impact larger than the limit impact setting value has been applied. When fed with the impact limit signal, the gain switching control circuit 81 sets the first switching circuit 64 to its terminal b. This furnishes the usual gain FE signals to the focussing servo loop.

That is, if a large impact is applied during high-speed seek to the optical disc device 60, the FE signals are restored to the original gain to prevent the optical head 61 from being destroyed due to collision against the optical disc 100 as well as to assure stable data recording/reproduction immediately after occurrence of impact At the layer jump time, the layer jump pulse generator 77 of the optical disc device 60 sends layer jump pulses to the adder 70, while turning off the focussing servo loop.

On application of a large impact on the optical disc device 60, the comparator 80 sends the impact limit signal to the focussing loop control circuit 76. When fed with the impact limit signal, the focussing loop control circuit 76 sets the second switching circuit 67 to its terminal b to turn on the focussing servo loop. This permits the driving circuit 71 to control the biaxial actuator 61b based on the FE signals.

That is, if a large impact is applied during layer jump, the optical disc device 60 turns on the focussing servo loop to prevent destruction of the optical head 61 due to collision against the optical disc 100 to assure stable data recording/ reproduction immediately after application of the impact.

As described above, if a large impact is applied from outside to the optical disc device 60 while it is performing a special operation as the focussing servo loop is turned off, it is possible to prevent destruction of the optical head 61 due to collision against the optical disc 100.

A fourth embodiment of the present invention is now explained.

The third embodiment of the present invention is applied to an optical disc device 110 configured as shown in FIG. 4. Meanwhile, the optical disc device 110 is of the land/groove recording/reproducing system.

The optical disc device 110 includes a tracking loop switching control circuit 122 which is signaled when an impact from outside as detected via a shock sensor 119 exceeds a preset value, and a tracking polarity control circuit 123 for returning the polarity of the tracking error signals (TE signals) to its original polarity.

The optical head 111 includes a biaxial actuator 111b for driving an objective lens 111a in the tracking and focussing directions. The optical head 111 radiates the laser light to the optical disc, detects the return light from the optical disc and sends the detection output to a tracking error signal generating circuit 112.

The tracking error signal generating circuit 112 generates the TE signals based on the detection output to and sends the generated TE signals to a polarity reversion circuit 113, a terminal b of a tracking polarity switch 114 and to the track jump pulse generating circuit 124.

The tracking error signal generating circuit 112 generates TE signals based on the above detection signal to and sends the produced TE signals to the polarity reversion circuit 113, terminal b of the tracking polarity switch 114 and to a track jump pulse generating circuit 124, based on the above-mentioned detection output. The generated TE signals are those produced when the light beam is illuminating a land of the optical disc.

The polarity reversion circuit 113 reverses the polarity of the TE signals when the light beam is illuminating a groove on the optical disc. That is, the polarity reversion circuit 113 reverses the polarity of the TE signals to send the resulting signals to the terminal a of the tracking polarity switch 114.

The tracking polarity switch 114 is responsive to land/ groove switching to output TE signals. The tracking polarity switch 114 is changed over by the tracking polarity control circuit 123 to send the TE signals sent to the terminal a or b to a phase compensation circuit 115. The phase compensation-circuit 115 phase-compensates the TE signals and sends the phase-compensated TE signals to a tracking loop switch 116.

The tracking polarity switch 114 is responsive to land/ groove switching to output TE signals. The tracking polarity switch 114 is changed over by the tracking polarity control circuit 123 to send the TE signals sent to the terminal a or b to the phase compensation circuit 115, which then phase-compensates the TE signals to send the resulting signals to the tracking loop switch 116.

The tracking loop switch 116 is set to its on or off state by the tracking loop switching control circuit 122. Specifically, the tracking loop switching control circuit 122 turns the tracking loop switch 116 on or off in the case of application of tracking servo or in the case of track jumping, with the tracking servo being then turned off, respectively. On termination of track jumping, the tracking loop switching control circuit 122 again sets the switch 116 to its on state. When set to its on state, the tracking loop switch 116 sends the TE signals from the phase compensation circuit 115 via adder 117 to a tracking driver.

On the other hand, a track jump pulse generating circuit 124 generates track jump pulses, depending on the number of tracks to be jumped, and sends the generated pulses via adder 117 to a tracking driver 118.

The tracking driver 118 drives the objective lens 111a via the biaxial actuator 111b, so that the light beam illuminated on the optical disc will be just-track, based on the TE signals from the adder 117, while driving the objective lens 111a via the biaxial actuator 111b, in order to effectuate preset track jump, based on the track jump pulse from the adder 117.

Thus, the optical disc device 110 generates optimum TE signals, responsive to the land/groove switching, in order to effectuate tracking control. For track jumping, the optical disc device 100 transiently turns off the tracking servo loop.

The operation when an impact is applied from outside during track jumping, that is when the tracking servo is turned off, is explained.

On detection of an impact from outside, the shock sensor 119 sends a signal proportionate to the impact via an amplifier 120 to a comparator 121.

The comparator 121 compares the impact value from outside, derived from a signal from the amplifier 120, to a pre-set limit impact value. If it is the impact from outside that is larger, the comparator 121 sends an impact limit signal specifying that result to the tracking loop switch control circuit 122, tracking polarity control circuit 123 and to the track jump pulse generating circuit 124.

When fed with the impact limit signal from the comparator 121, the tracking loop switching control circuit 122 sets the tracking loop switch 116 to its on-state. If fed simultaneously with the impact limit signal, the track jump pulse generating circuit 124 discontinues the generation of the track jump pulses. This again turns the tracking servo loop on so that the tracking driver I 18 controls the biaxial actuator 111b based on the tracking error signals. That is, if a strong impact is applied from outside during track jump, the operation of the objective lens is not constant in the conventional system, because tracking servo is not applied. In the above optical disc device 110, tracking servo is applied in this case, therefore data can be recorded/ reproduced for the target track.

If an impact is applied from outside during tracing a groove, the impact limit signal is sent to the tracking polarity control circuit 123. At this time, the tracking polarity control circuit 123 sets the tracking polarity switch 114 to its terminal a. This enables the land to be traced so that stable recording/reproduction can be achieved as compared to the case of continuing the groove tracing, even on application an of impact from outside.

A fifth embodiment of the present invention is now explained.

Figure 15:
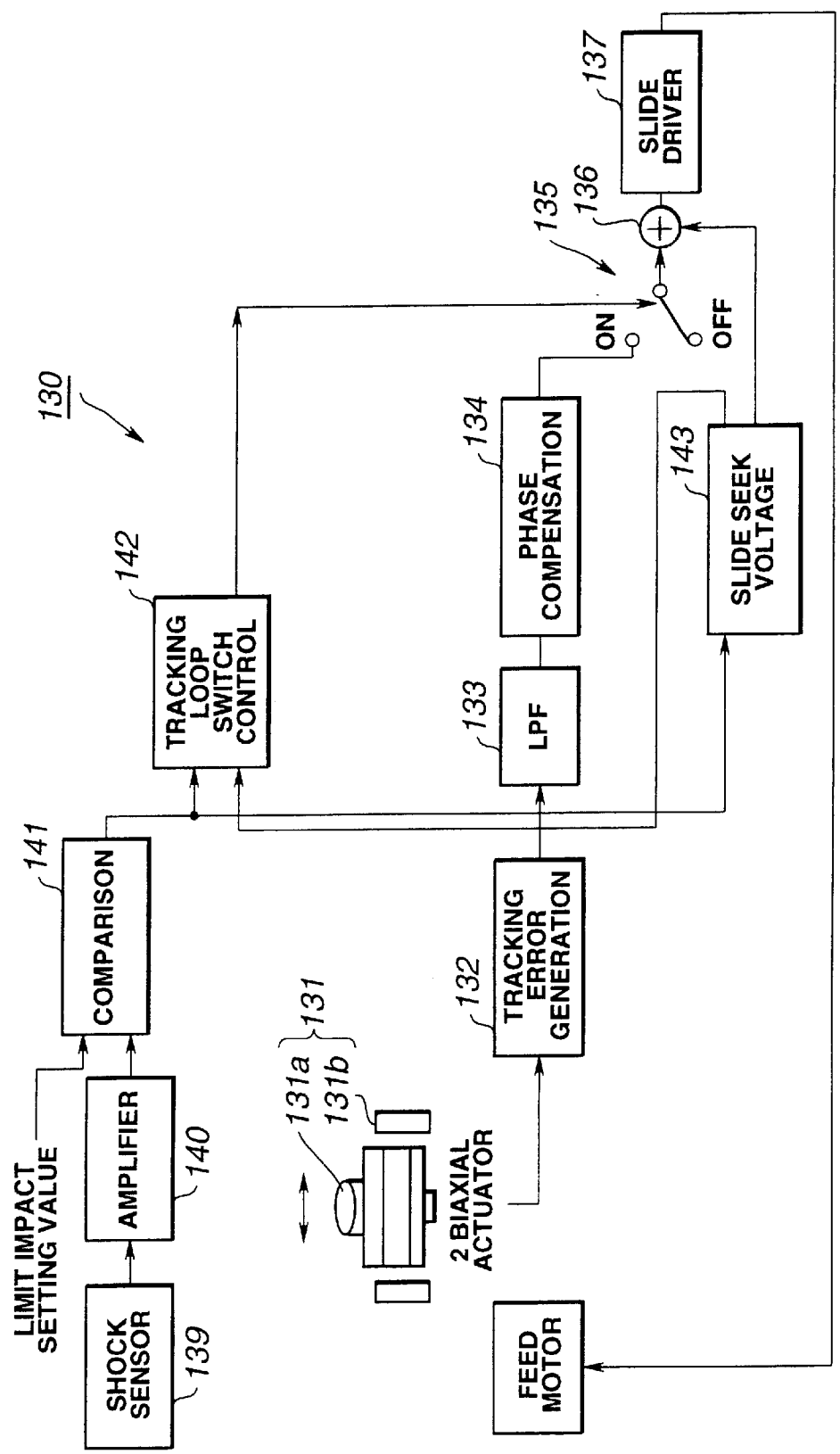
FIG. 15 is a block diagram showing the structure of an optical disc apparatus according to a fifth embodiment of the present invention.

The present fifth embodiment of the present invention can be applied to an optical disc device 130 shown for example in FIG. 15.

The optical disc device 130 includes an optical head 131, having a biaxial actuator 131b for driving the objective lens 131a in the tracking and focussing directions, a tracking error generating circuit 132 for generating TE signals based on a detection output of the light beam of the optical head 131, a low-pass filter circuit 133 for removing noise components of the TE signals, a phase compensation circuit 134 for phase-compensating the TE signals freed of noise, a tracking loop switch 135 for turning the tracking loop on or off, an adder 136, a slide driver 137, and a feed motor 138 for sliding the optical head 131 during the seek operation.

The tracking loop switch 135 is set to on or off by a tracking loop switch control circuit 142. Specifically, the tracking loop switch control circuit 142 turns the tracking loop switch 135 on or off for applying tracking servo or performing a seek operation (turning off the tracing servo), respectively, while again turning on the tracking loop switch 135 after the end of the servo operation. When turned on, the tracking loop switch 135 sends the TE signals from the phase compensation circuit 134 via adder 136 to the slide driver 137.

A slide seek voltage generating circuit 143 generates a slide seek voltage (slide seek signal) depending on the seek destination to send the signal via adder 136 to the slide driver 137.

The slide driver 137 drives the objective lens 131a via the biaxial actuator 131b, based on the TE signals from the adder 136, so that the light beam illuminated on the optical disc will be just-track, or the pre-set seek operation will be performed based on the slide seek signal from the adder 136.

That is, during the seek operation, the tracking loop switch 135 is turned off, the slide seek voltage generating circuit 143 generates a slide seek signal and sends generated slide seek signal via adder 136 to the side driver 137. This allows the slide driver 137 to perform the seek operation of the optical head 131.

If an impact is applied from outside during the seek operation, the shock sensor 139 detects the impact from outside and sends a signal corresponding to the impact via amplifier 140 to the comparator 141.

The comparator 141 compares the value of the impact from outside derived from the signal from the amplifier 140 to a pre-set limit impact setting value and, if it is the impact from outside that is larger, the comparator sends an impact limit signal specifying that result to the tracking loop switch control circuit 142 and to the slide seek voltage generating circuit 143.

If fed with the above impact limit signal from the comparator 141, the tracking loop switch control circuit 142 sets the tracking loop switch 135 to its on state. Simultaneously, the slide seek voltage generating circuit 143, fed with the impact limit signal, discontinues producing the slide seek signal. This again turns the tracking servo loop on so that the slide driver 137 controls the biaxial actuator 131b based on the tracking error signals. That is, if a strong impact is applied from outside during the seek operation, the operation of the objective lens in the conventional system is not constant, because the tracking servo is not applied. In the present invention, since the tracking servo is applied in such case, data recording/reproduction can be performed immediately for the target track.

Although there is provided only one impact sensor in the above-described embodiment, it is of course possible to provide a plurality of shock sensors.

For realizing high recording density on the optical disc, a double lens type lens set, which realizes a high numerical aperture (NA), may be used as the objective lens provided facing the optical disc.

Figure 16:
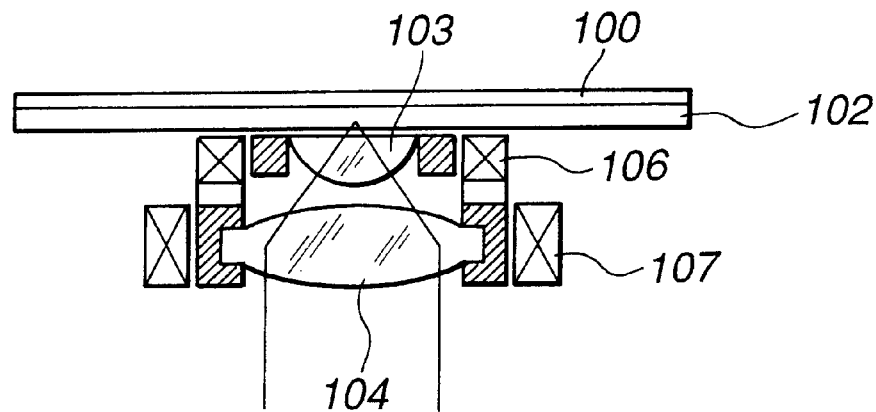
FIG. 16 os a cross-sectional view showing the structure of a double-lens type objective lens.

This double lens type lens set is made up of two lenses, that is a forward lens 103 and an objective lens 104, as shown in FIG. 16. The forward lens 103 has a planar surface facing the optical disc 100 and an aspherical curved surface facing the objective lens 104, while the objective lens 104 is an aspherical lens. The forward lens 103 may also be a plano-spherical lens made up of a planar surface and a spherical surface.

This double lens type lens set has the forward lens 103 and the objective lens 104 driven by the actuators 106, 107 respectively.

The actuator 106 is configured for causing movement of the forward lens 103 relative to the objective lens 104 in the direction along the optical axis (in the up-and-down direction in the drawing). The forward lens 103 and the objective lens 104 are moved in the direction along the optical axis (in the focussing direction) under the voltage applied to the actuator 106.

The actuator 107 is a biaxial actuator adapted to cause movement of the lenses 103, 104 in the direction perpendicular to the track of the optical disc 100 (in the tracking direction). This actuator 107 is fed with the driving signals in the focussing and tracking directions for adjusting the distance of the double lens type lens set (forward lens 103 and the objective lens 104) from the optical disc 100 while causing movement of the light beam in the perpendicular direction relative to the track.

With the above-described structure, the distance between the objective lens 104 and the optical disc 100 can be adjusted as in the conventional double lens type lens set. At the same time the distance between the forward lens 103 and the objective lens 104 also can be adjusted. The distance between the two lenses and that between the objective lens 104 and the optical disc 100 can be adjusted depending on the thickness of the disc substrate 102 of the optical disc 100 for suppressing generation of the spherical aberration.

With the use of a light source not for light less than 680 nm in wavelength, this double lens type lens set has a NA as high as 0.7 or higher, such as 0.81. The working distance between the objective lens 4 and the optical disc 100 is not larger than 560 $\mu$m, such as 100 $\mu$m. Thus, with the double lens type lens set, the distance between the double lens type lens set and the optical disc is small for high NA, with the aberration being reduced.

Figure 17:
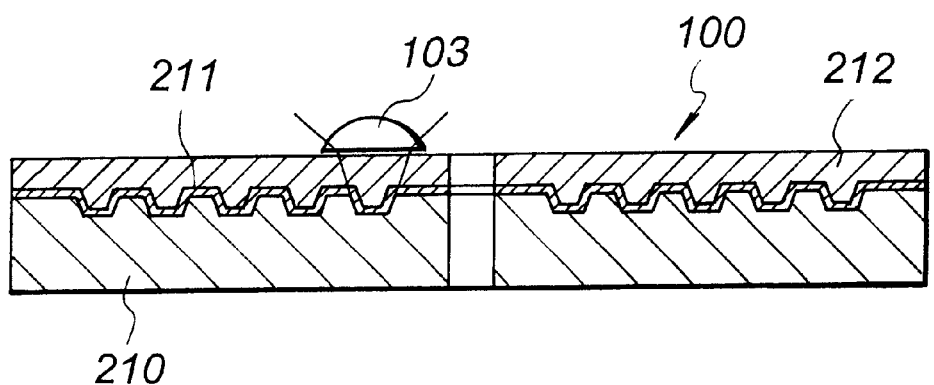
FIG. 17 is a cross-sectional view showing the structure of an objective lens.

An example of the optical disc 100 is explained by referring to FIG. 17.

Using a stamper which realizes the pitch and the pitch fluctuations, a replica substrate 210 for the optical disc 100 is fabricated by the injection molding method. A recording film or a reflective film 211 is then formed on a signal surface of the replica substrate 210. If the optical disc is a ROM, an reflective film of, for example, A1, is formed thereon.

A cover layer 212 is further formed thereon. The cover layer 212 is formed by supplying a UV resin dropwise on the layers of the substrate, prepared as described above, and by rotating and stretching the UV resin. Alternatively, the cover layer may be formed by bonding a sheet of polycarbonate with a UV resin.

The light transmitting layer of the optical disc, thus prepared, has a thickness of, for example, 3 to 177 $\mu$m.

A sequence of steps of the optical disc recording/reproducing method is hereinafter explained. The method for recording/reproducing information signals for an optical disc using an optical pickup of the present invention includes an objective lens arranged facing the optical disc for converging and illuminating the laser light on a signal recording surface of the optical disc and objective lens driving means for driving the objective lens at least in a direction perpendicular to the signal recording surface, displacement signal generating means for generating from the return laser light illuminated by the objective lens to the optical disc a displacement signal corresponding to displacement of a converging point of the laser light from the signal recording surface in the perpendicular direction and servo means for driving and controlling the objective lens by the objective lens driving means in the perpendicular direction, based on the displacement signal from the displacement signal generating means, so that the converging point will be on a signal recording surface of the optical disc. The above sequence of operations includes a step of detecting the position of the objective lens with respect to the optical disc, and a step of outputting a permission signal for according permission for the servo operation by the servo means when the objective lens position detected by the position detection means is within the pre-set range.

The optical disc recording/reproducing method and apparatus are directed to pull-in of focussing servo of the optical disc and, more specifically, preventing the focussing servo pull-in to the optical disc surface and preventing collision of the objective lens against the optical disc.

What is claimed is:

1. An optical disc apparatus for recording and/or reproducing information signals using an optical disc, said apparatus comprising:
   an optical pickup including an objective lens, which is arranged facing an optical disc, for converging and illuminating laser light on a signal recording surface of said optical disc, said optical pickup further including an objective lens driver for driving said objective lens at least in a direction perpendicular to said signal recording surface;
   a focusing circuit for generating a focusing error signal using laser light reflected by said optical disc, said focusing error signal corresponding to displacement of a converging point of said laser light from the signal recording surface of said optical disc in said perpendicular direction;
   a servo control circuit for controlling said objective lens driver based on said focusing error signal so that said converging point is relocated so as to be on said signal recording surface of the optical disc;
   a position detector for detecting a distance between said objective lens and said optical disc wherein a position signal output by said position detector is provided to said servo control circuit to prevent a collision of said objective lens with said optical disc; and
   an impact detector for electronically detecting an impact to said optical disc apparatus from outside.

2. The optical disc apparatus according to claim 1, wherein when a position of said objective lens detected by said position detector is within a predetermined range, said position detector outputs a permission signal that enables said servo control circuit to control said objective lens driver.

3. The optical disc apparatus according to claim 1, wherein when a position of the objective lens detected by said position detector is outside a predetermined safe range, said objective lens driver is signaled to to move the objective lens away from said optical disc to prevent a collision of the objective lens against the optical disc.

4. The optical disc apparatus according to claim 1, wherein said servo control circuit is responsive to an impact detection signal output by said impact detector indicative of a strength of an impact detected by said impact detector, said servo control circuit responding to said impact detection signal so as to prevent collision of said objective lens against the optical disc caused by said impact.

5. The optical disc apparatus according to claim 1, wherein said servo control circuit includes a comparator for comparing an impact detection signal output by said impact detector indicative of a strength of an impact detected by said impact detector with a predetermined value, and wherein said servo control circuit controls said objective lens driver to avoid collision of said objective lens against the optical disc if said comparator determines that said impact detection signal exceeds said predetermined value.

6. The optical disc apparatus according to claim 1, wherein said servo control circuit further comprises an pull-in signal decision unit and a pull-in permission signal, said pull-in permission signal being responsive to and maskable by said pull-in signal decision unit.

7. The optical disc apparatus according to claim 1, wherein said position detector comprises a sensor lens mounted on a biaxial actuator, wherein said objective lens is also mounted on said biaxial actuator.

8. The optical disc apparatus according to claims 7, wherein said biaxial actuator is driven by an actuator driving circuit comprising a zero-crossing detection circuit.

9. The optical disc apparatus according to claim 1, wherein said impact detector comprises a plurality of shock sensors.

10. An optical disc device comprising:
    servo loop switching means for switching on/off of a focusing servo loop in which an optical head radiates a light beam to an optical disc and in which optical head driving means drivers said optical head in response to a detection of reflected light from the optical disc so as to focus light from said optical head on said optical disc;
    special operation control means for turning off said servo loop switching means when focus is achieved so that said optical head will perform a special operation other than focusing;
    impact detection means for detecting an impact to said device from outside; and
    servo loop switching control means for turning on said servo loop switching means in response to detection of said impact by said impact detection means during said special operation of said optical head.

11. The optical disc device according to claim 10, wherein said special operation control means includes layer jump pulse generating means for generating a layer jump pulse during use of a multi-layered optical disc such that said optical head driving means performs a layer jump as said special operation based on said layer jump pulse.

12. The optical disc device according to claim 10, wherein said special operation control means includes track jump pulse generating means for generating track jump pulses, wherein said optical head driving means is controlled to effectuate track jump as said special operation based on said track jump pulses.

13. The optical disc device according to claim 10, wherein said special operation control means includes slide seek signal generating means for generating a slide seek signal for effectuating slide seek as said special operation, wherein said optical head driving means is controlled to effectuate slide seek based on said slide seek signal.

14. The optical disc device according to claim 10, further comprising:
    focusing error signal generating means for a generating focusing error signal used by said focusing servo loop during focusing;
    attenuation means for attenuating said focusing error signals during a high speed seek operation and for discontinuing attenuation of said focusing error signals on detection of an impact by said impact detection means.

15. A method for controlling an optical head comprising:

turning off a servo loop in which an optical head radiates a light beam towards an optical disc and optical head driving means drive said optical head based on a detection of reflected light from the optical disc;

controlling said optical head driving means so that said optical head will perform a special operation;

detecting an impact from outside; and controlling said servo loop to be turned on upon detection of an impact during the special operation of said optical head.

16. The optical head controlling method according to claim 15 wherein, as said special operation of the optical head, layer jump pulses for effectuating layer jump on a multi-layered optical disc are generated and wherein said optical head driving means is controlled so as to effectuate layer jump based on said layer jump pulses.

17. The optical head controlling method according to claim 15, wherein, as said special operation of the optical head, track jump pulses for effectuating track jump on an optical disc are generated and wherein said optical head driving means is controlled so as to effectuate track jump based on said track jump pulses.

18. The optical head controlling method according to claim 15 wherein, as said special operation of the optical head, a slide seek signal for effectuating slide seek is generated and wherein said optical head driving means is controlled to effectuate slide seek based on said slide seek signal.

19. An optical disc apparatus for recording and/or reproducing information signals using an optical disc, said apparatus comprising:

an optical pickup including an objective lens which is arranged facing an optical disc for converging and illuminating laser light on a signal recording surface of said optical disc, said optical pickup further including an objective lens driver for driving said objective lens at least in a direction perpendicular to said signal recording surface;

a focusing circuit for generating a focusing error signal using laser light reflected by said optical disc, said focusing error signal corresponding to displacement of a converging point of said laser light from the signal recording surface of said optical disc in said perpendicular direction;

a servo control circuit for controlling said objective lens driver based on said focusing error signal so that said converging point is relocated so as to be on said signal recording surface of the optical disc; and an impact detector for electronically detecting an impact to said optical disc apparatus from outside.

20. The optical disc apparatus according to claim 19, wherein said servo control circuit is responsive to an impact detection signal output by said impact detector indicative of a strength of an impact detected by said impact detector, said servo control circuit responding to said impact detection signal so as to prevent collision of said objective lens against the optical disc caused by said impact.

21. The optical disc apparatus according to claim 19, wherein said servo control circuit further comprises a comparator for comparing an impact detection signal output by said impact detector indicative of a strength of an impact detected by said impact detector with a predetermined value, and wherein said servo control circuit controls said objective lens driver to avoid collision of said objective lens against the optical disc if said comparator determines that said impact detection signal exceeds said predetermined value.

22. A method of preventing collision of an objective lens and an optical disc in an optical disc apparatus for recording and/or reproducing information signals, wherein said objective lens is moved along a direction perpendicular to said optical disc by an objective lens driver, said method comprising:

detecting a position of said objective lens with respect to said optical disc with a lens position detector; [and]

electronically detecting an impact to said apparatus from outside;

using an output of said lens position detector to control said objective lens driver so as to prevent a collision between said objective lens and said optical disc.

23. The method according to claim 22, wherein said using an output of said lens position detector further comprises outputting a permission signal enabling a servo control circuit to operate said objective lens driver when a position of said objective lens as detected by said position detector is within a predetermined safe range.

24. The method according to claim 22, wherein said using an output of said lens position detector further comprises signalling said objective lens driver to move said objective lens away from said optical disc when a position of the objective lens as detected by said position detector is outside a predetermined safe range.

25. The method according to claim 22, further comprising:

outputting an impact detection signal indicative of a strength of said detected impact; and using said impact detection signal to control said objective lens driver so as to prevent a collision of said objective lens against the optical disc caused by said impact.

26. The method according to claim 25, wherein said using said impact detection signal further comprises:

comparing said impact detection signal to a predetermined value; and controlling said objective lens driver to avoid collision of said objective lens against the optical disc if said impact detection signal exceeds said predetermined value.

27. A method of preventing collision of an objective lens and an optical disc in an optical disc apparatus for recording and/or reproducing information signals, wherein said objective lens is moved along a direction perpendicular to said optical disc by an objective lens driver, said method comprising:

electronically detecting an impact to said apparatus from outside and outputting an impact detection signal indicative of a strength of said impact; and using said impact detection signal to control said objective lens driver so as to prevent a collision between said objective lens and said optical disc.

28. The method according to claim 27, wherein said using said impact detection signal further comprises:

comparing said impact detection signal to a predetermined value; and controlling said objective lens driver to avoid collision of said objective lens against the optical disc if said impact detection signal exceeds said predetermined value.

* * * * *

UNITED STATES PATENT AND TRADEMARK OFFICE
CERTIFICATE OF CORRECTION

PATENT NO. : 6,246,647 B1  
DATED : June 12, 2001  
INVENTOR(S) : Keiichi Tsutsui et al.

Page 1 of 1

It is certified that error appears in the above-identified patent and that said Letters Patent is hereby corrected as shown below:

<u>Column 20, claim 10,</u>  
Line 31, replace "drivers" with -- drive --.

<u>Column 22, claim 22,</u>  
Line 12, delete "[and]".

Signed and Sealed this

Nineteenth Day of March, 2002

Attest:

Attesting Officer

JAMES E. ROGAN  
Director of the United States Patent and Trademark Office